(12) United States Patent
Gaylard et al.

(10) Patent No.: US 10,179,613 B2
(45) Date of Patent: Jan. 15, 2019

(54) VEHICLE AERODYNAMIC APPARATUS

(71) Applicant: JAGUAR LAND ROVER LIMITED, Whitley, Coventry, Warwickshire (GB)

(72) Inventors: Adrian Gaylard, Southam (GB); Christopher Thompson, Leamington Spa (GB); Ross Turner, Clifford Chambers (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 15/501,832

(22) PCT Filed: Aug. 5, 2015

(86) PCT No.: PCT/EP2015/068028
§ 371 (c)(1),
(2) Date: Feb. 4, 2017

(87) PCT Pub. No.: WO2016/020421
PCT Pub. Date: Feb. 11, 2016

(65) Prior Publication Data
US 2017/0240221 A1    Aug. 24, 2017

(30) Foreign Application Priority Data
Aug. 5, 2014   (GB) .................................. 1413843.2

(51) Int. Cl.
| | |
|---|---|
| *B62D 35/00* | (2006.01) |
| *B62D 25/04* | (2006.01) |
| *B62D 35/02* | (2006.01) |
| *B62D 37/02* | (2006.01) |

(52) U.S. Cl.
CPC ........... *B62D 35/008* (2013.01); *B62D 25/04* (2013.01); *B62D 35/007* (2013.01); *B62D 35/02* (2013.01); *B62D 37/02* (2013.01)

(58) Field of Classification Search
CPC .... B62D 25/04; B62D 35/007; B62D 35/008; B62D 37/02
(Continued)

(56) References Cited

U.S. PATENT DOCUMENTS 3,072,431 A * 1/1963 Shumaker .............. B60J 1/2008
                                                          296/91
3,960,402 A    6/1976 Keck
(Continued)

FOREIGN PATENT DOCUMENTS

| DE | 19607886 A1 | 9/1997 |
|---|---|---|
| DE | 102004034677 A1 | 2/2006 |

(Continued)

OTHER PUBLICATIONS

Combined Search and Examination Report for application No. GB1413843.2, dated Feb. 6, 2015, 7 pages.
(Continued)

*Primary Examiner* — Dennis H Pedder
(74) *Attorney, Agent, or Firm* — Reising Ethington P.C.

(57) ABSTRACT

The present application relates to a vehicle (401). A first duct (457) having a first duct inlet (467) and a first duct outlet (469) is provided on a first lateral side of the vehicle (401). A second duct (457) having a second duct inlet (467) and a second duct outlet (469) is provided on a second lateral side of the vehicle (401). The first and second duct inlets (467) are arranged substantially in line with or inset from the respective first and second lateral sides of the vehicle (401). The first and second duct outlets (469) are disposed at or proximal to a rear of the vehicle (401) and arranged, in use, to direct respective first and second jets of air inwardly to control the lateral propagation of a wake formed behind the vehicle (401). Duct sidewalls are formed by surfaces of rear pillars of the vehicle (401).

20 Claims, 28 Drawing Sheets

(58) Field of Classification Search
USPC ............................... 296/180.1–180.5, 193.06
See application file for complete search history.

(56) References Cited

U.S. PATENT DOCUMENTS

| | | | | |
|---|---|---|---|---|
| 4,174,863 | A * | 11/1979 | Gotz | B62D 35/007 |
| | | | | 296/180.5 |
| 4,441,752 | A * | 4/1984 | Buehrig | B60J 1/2008 |
| | | | | 296/180.1 |
| 5,927,795 | A * | 7/1999 | Townend | B62D 37/02 |
| | | | | 180/903 |
| 7,484,791 | B1 * | 2/2009 | Chen | B62D 35/001 |
| | | | | 296/180.5 |
| 9,139,238 | B2 * | 9/2015 | Visser | B62D 35/001 |

FOREIGN PATENT DOCUMENTS

| | | |
|---|---|---|
| EP | 1506911 A1 | 2/2005 |
| FR | 2892993 A1 | 5/2007 |
| GB | 2478818 A | 9/2011 |
| JP | S60127289 U | 8/1985 |
| JP | H0725368 A | 1/1995 |
| JP | 2002019649 A | 1/2002 |
| JP | 2002019650 A | 1/2002 |
| JP | 2013023199 A | 2/2013 |
| RO | 117681 B | 6/2002 |
| WO | WO9502532 A1 | 1/1995 |
| WO | WO2012101007 A1 | 8/2012 |
| WO | WO2013186130 A1 | 12/2013 |

OTHER PUBLICATIONS

International Search Report for International application No. PCT/EP2015/068028, dated Nov. 20, 2015, 5 pages.
Written Opinion for International application No. PCT/EP2015/068028, dated Nov. 20, 2015, 7 pages.
European Office Action corresponding to application No. 15 748 223.3, dated Sep. 28, 2018, 7 pages.

* cited by examiner

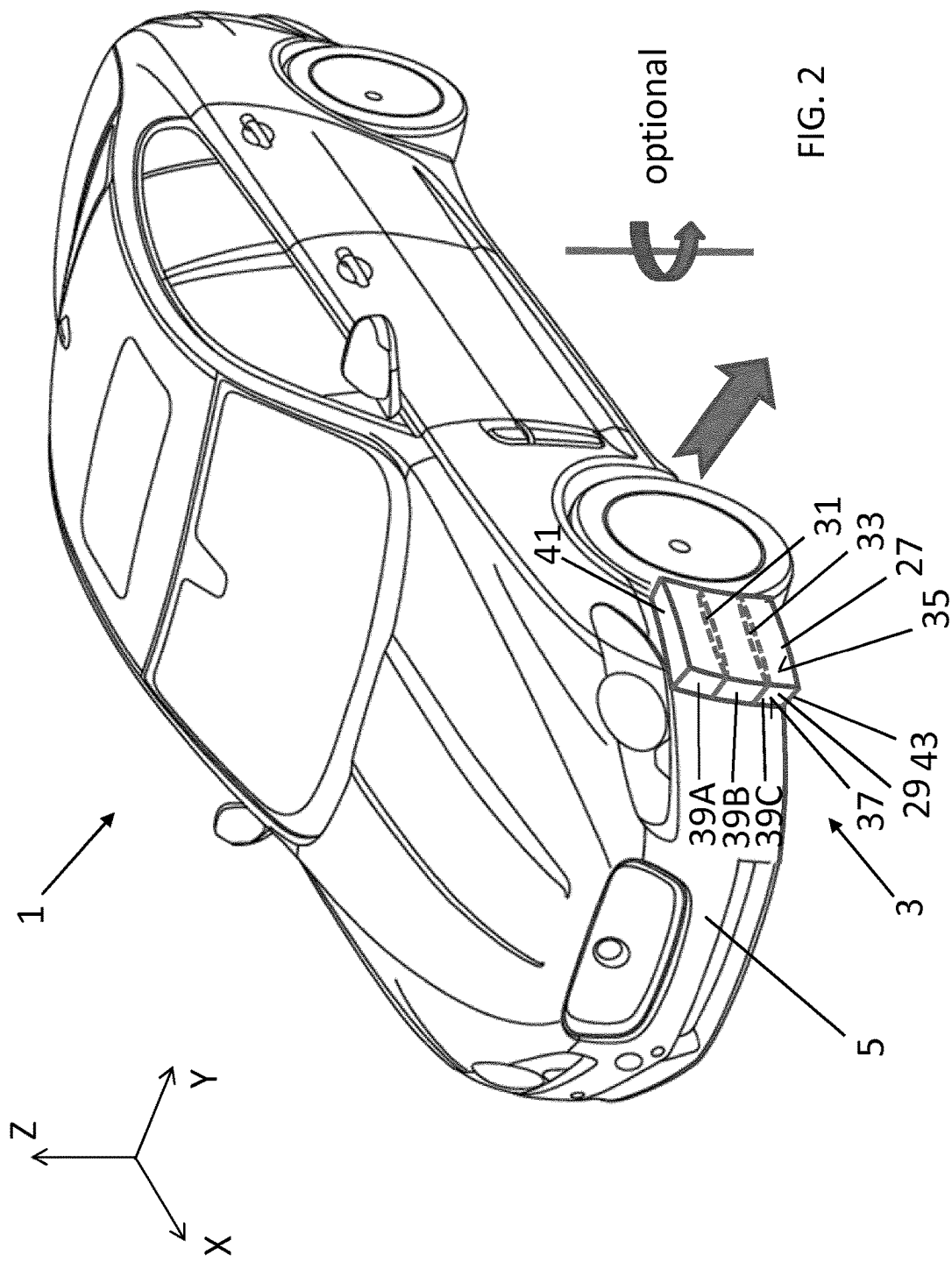

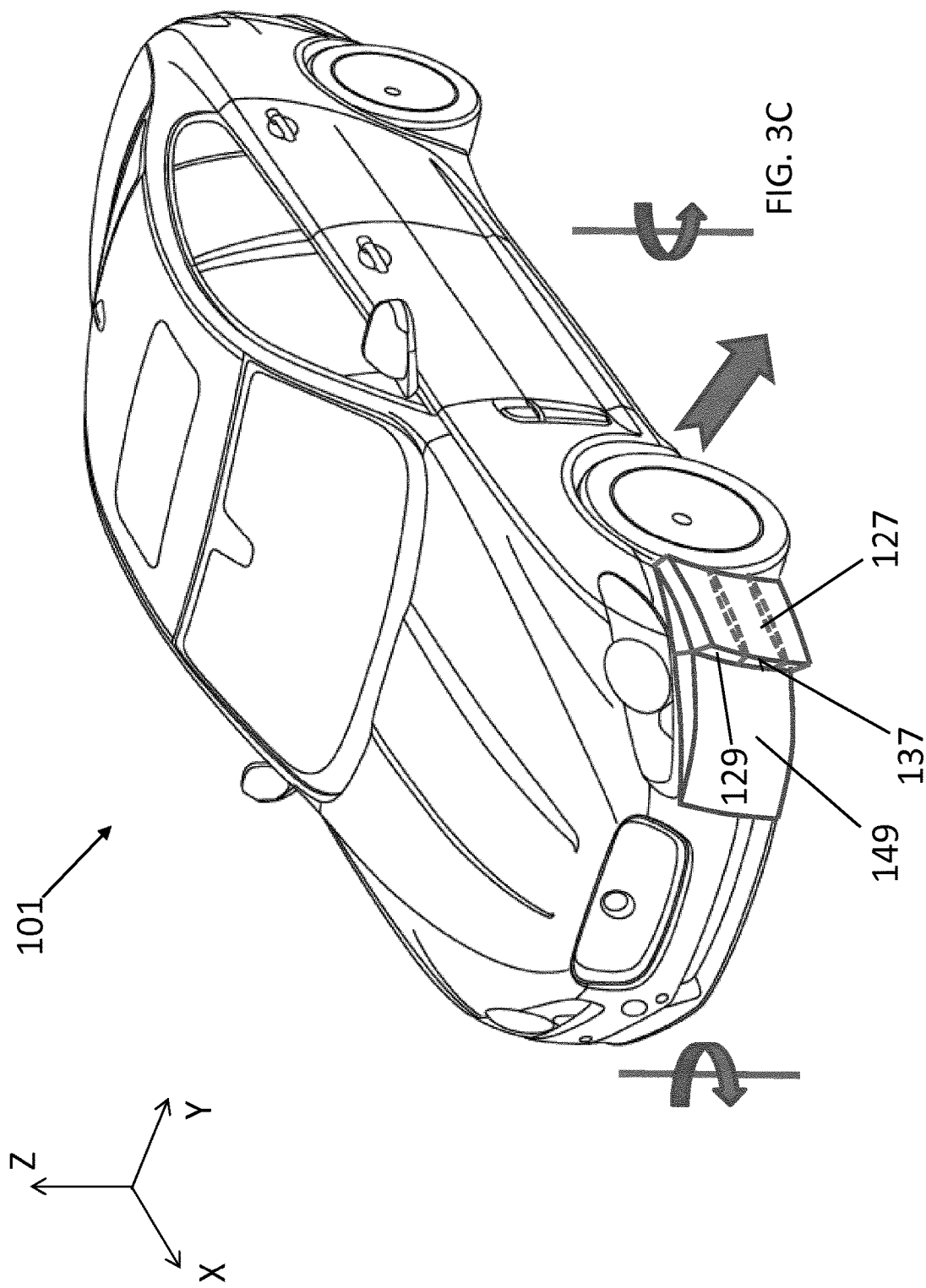

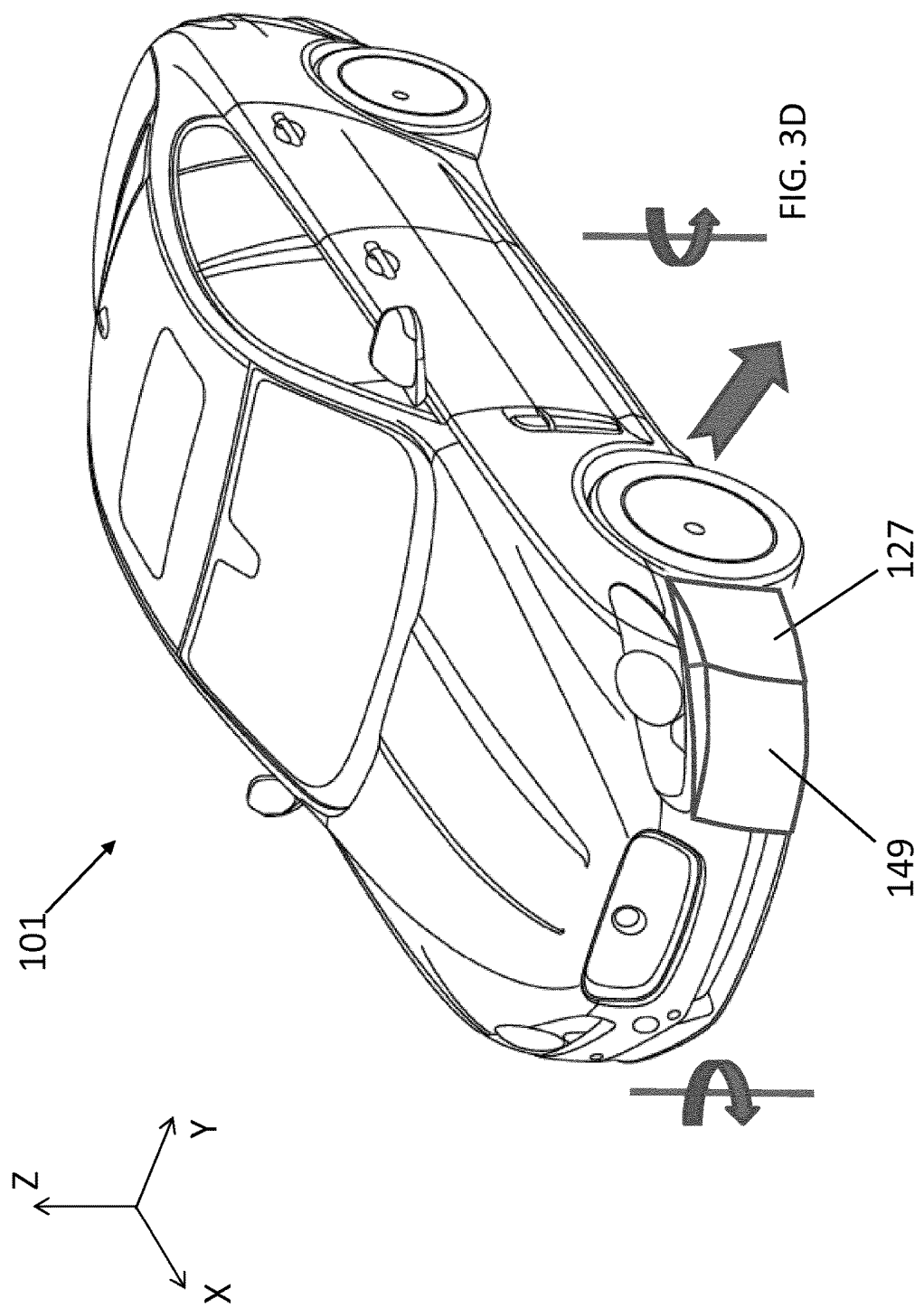

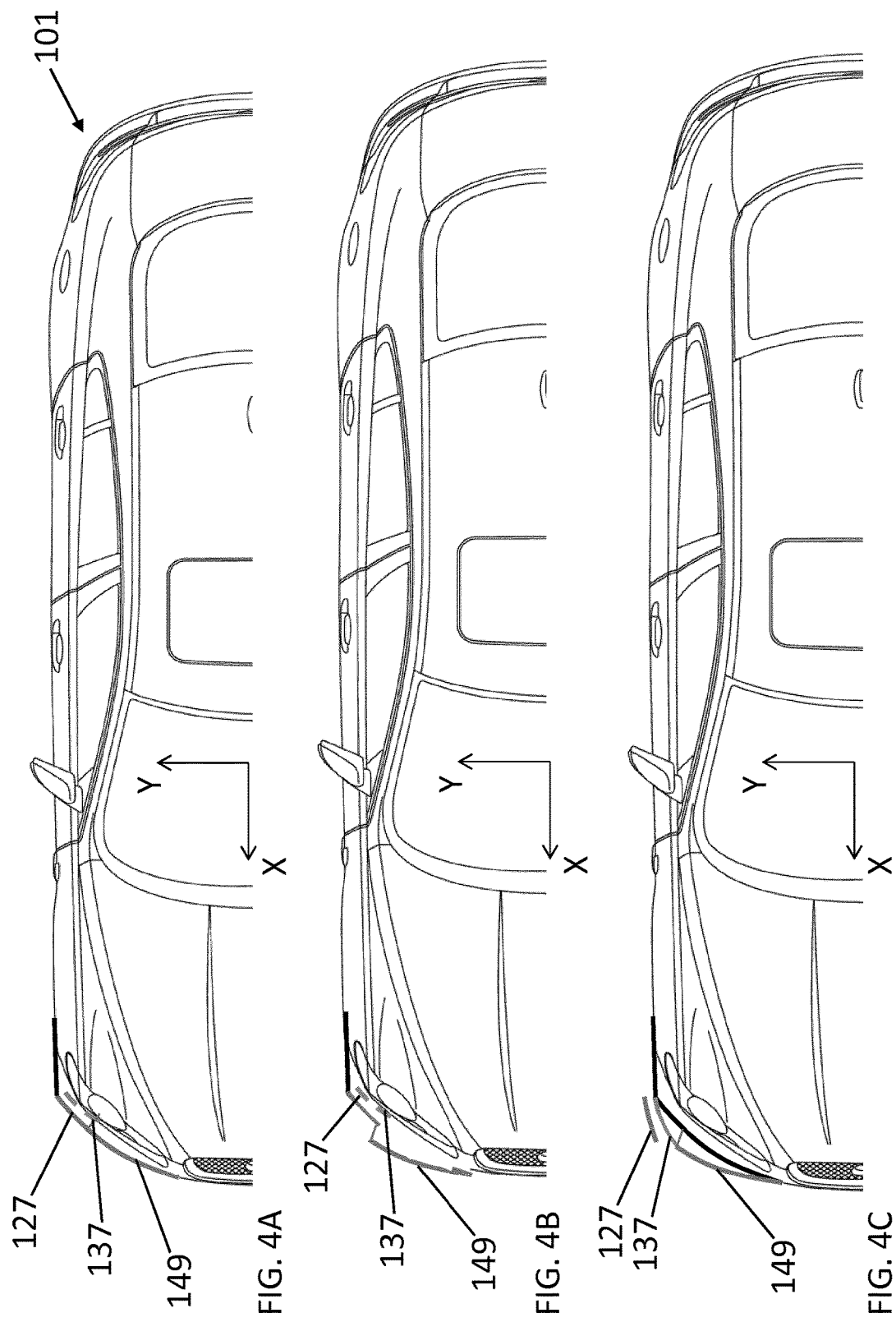

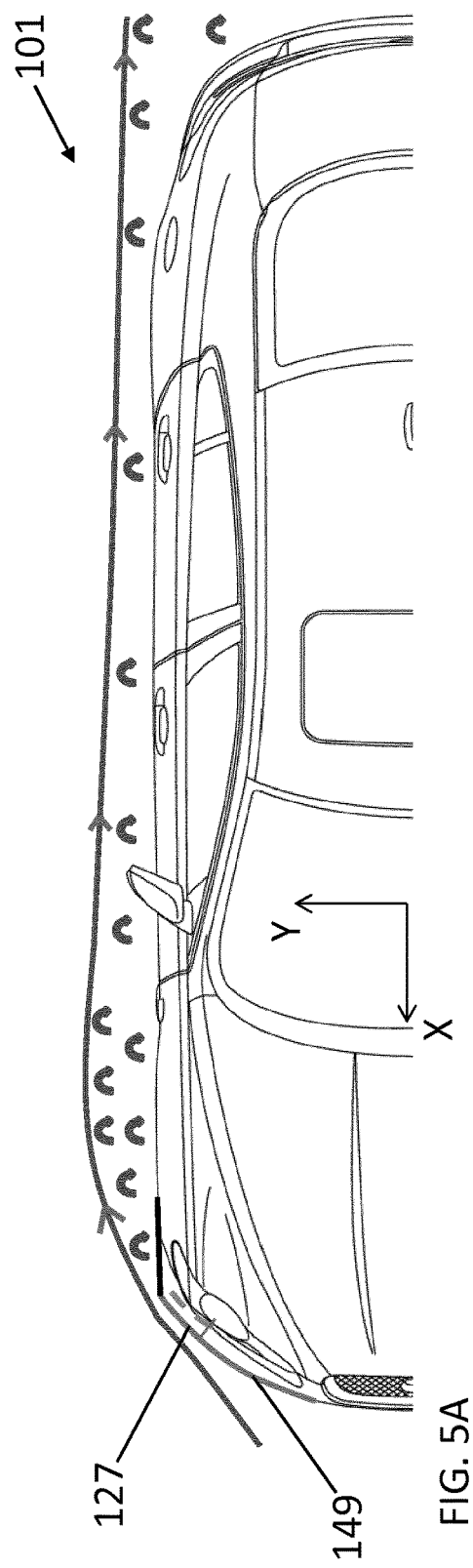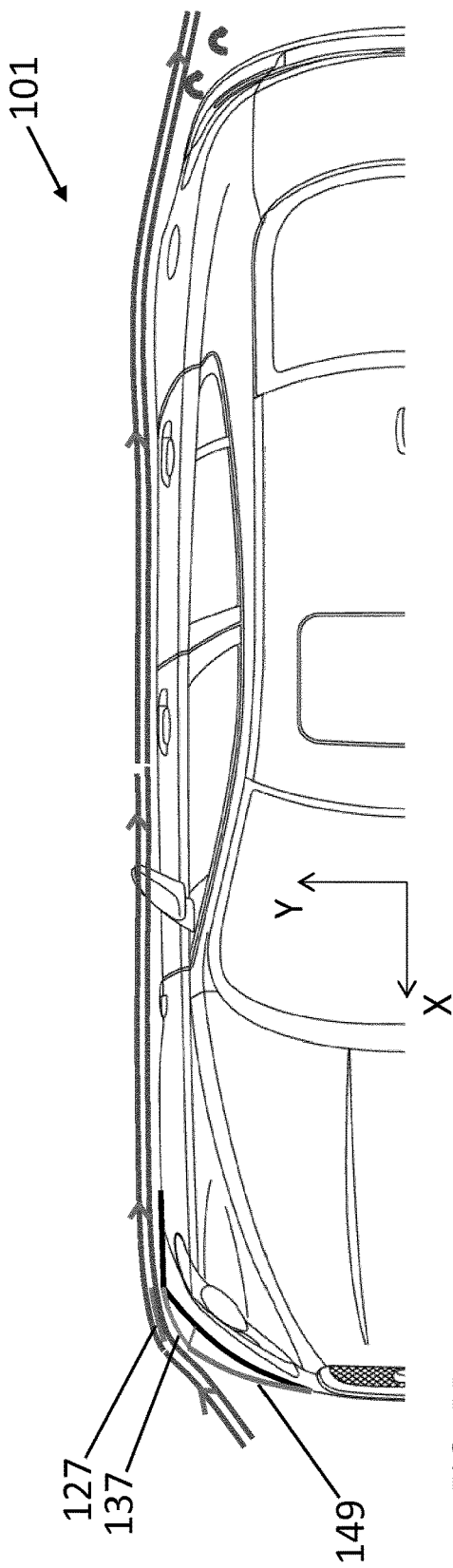

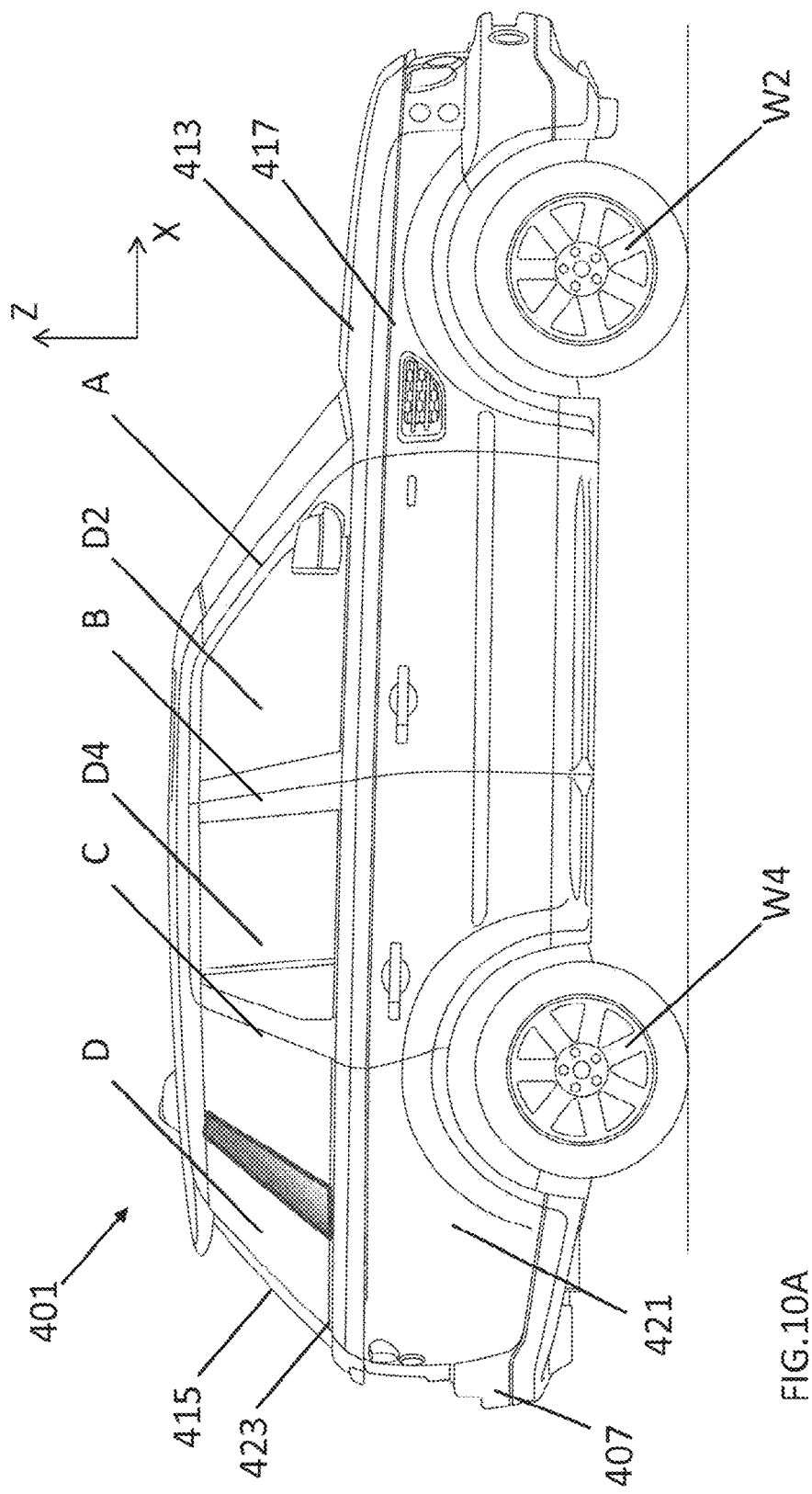

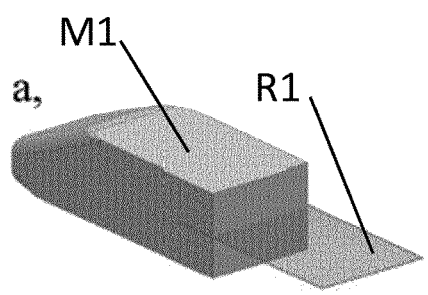
FIG. 12A
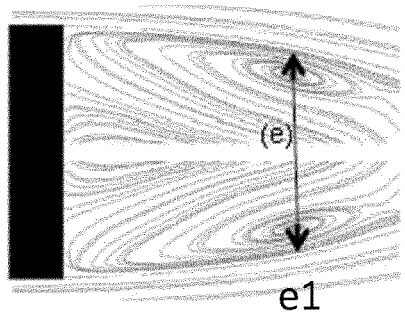
e1   FIG. 12B
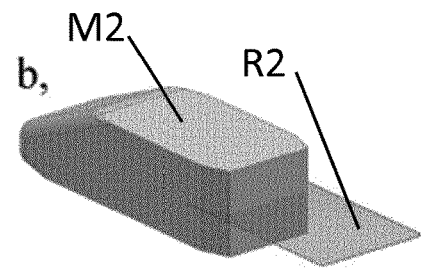
FIG. 13A
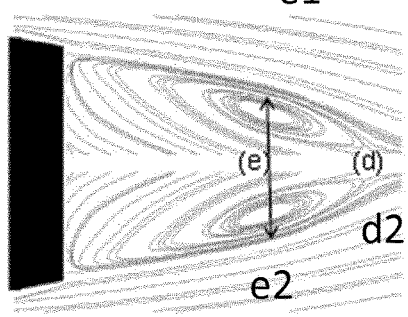
e2   FIG. 13B
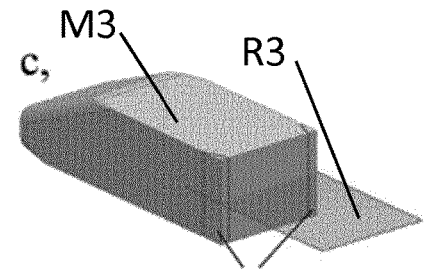
Ducted rear corners
FIG. 14A
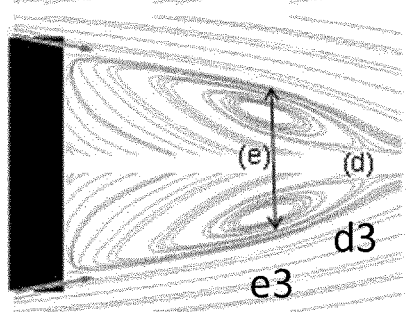
FIG. 14B

VEHICLE AERODYNAMIC APPARATUS

TECHNICAL FIELD

The present disclosure relates to a vehicle aerodynamic apparatus; to a guide vane assembly; to a guide vane and to a vehicle.

BACKGROUND

The drag of the rear facing surfaces of a car (base drag) can account for upwards of 30% of the total drag. 'Boat tailing' (a progressive reduction in vehicle width (Y) and/or height (Z) along a longitudinal axis (X) towards the rear of the vehicle) has been a historic countermeasure. This promotes base pressure recovery, reducing drag. However, aesthetic and packaging considerations limit its applicability in automotive design.

US20110000727 discloses air inlet openings formed in vertical fins extending from the longitudinal roof members. The air inlet openings direct air over an outer skin of a rear deck lid and onto a rear air deflection device.

US20120104800 discloses a vehicle having an opening formed between lateral end sections of the windshield and the adjacent A-pillars. The air flows through this gap-shaped opening when the vehicle is moving. This reduces the formation of high loss vortices in the lateral area of the vehicle.

EP2572966A1 discloses providing a protrusion at the rear of the vehicle to drawing air from inside the vehicle into the external flow, suppressing vortex formation. EP1098809B1 discloses the use of 'base bleed'. U.S. Pat. No. 7,886,859 discloses directing air entrained for the purposes of cooling for the purpose of drag reduction.

It is against this backdrop that the present invention has been conceived. At least in certain embodiments, the present invention seeks to overcome or ameliorate at least some of the shortcomings associated with the prior art arrangements.

SUMMARY OF THE INVENTION

Aspects of the present invention relate to a vehicle aerodynamic apparatus; to a guide vane assembly; and to a vehicle.

According to a further aspect of the present invention there is provided a vehicle comprising:
 a first duct having a first duct inlet and a first duct outlet; and
 a second duct having a second duct inlet and a second duct outlet;
 wherein the first and second duct inlets are arranged substantially in line with or inset from respective first and second lateral sides of the vehicle; and
 the first and second duct outlets are disposed at or proximal to a rear of the vehicle;
 the first and second ducts being arranged, in use, to direct respective first and second jets of air inwardly to control the lateral and/or longitudinal propagation of a wake formed behind the vehicle. The vehicle comprises a body structure having a roof mounted to pillars comprising first and second rear pillars, a surface of said first rear pillar defining a sidewall of said first duct and a surface of said second rear pillar defining a sidewall of said second duct. The first and second jets of air are directed inwardly towards a longitudinal centre line of the vehicle. The first and second jets of air each comprise a lateral flow component directed inwardly towards the longitudinal centre line of the vehicle. The first and second ducts provide passive airflow control devices. The air flows through the first and second ducts when the vehicle is moving resulting in the formation of said first and second jets of air. In use, the jet flow can draw the shear layers bounding the rear wake inboard, restructuring the wake in terms of width and closure length. At least in certain embodiments, the arrangement of the first and second ducts can help to reduce aerodynamic drag on the vehicle base by drawing air from the vehicle body side (roof, glazing or rear bumper), ducting it to the rear of the vehicle and introducing the resulting 'jet' flow into the base wake. The 'jet' flow can then help to draw the outer shear layers bounding the vehicle wake laterally inwardly (towards a vehicle centre line). This can narrow the wake and move the wake closure point upstream. This wake restructuring leads to pressure recovery and reduced base drag.

The first duct can be disposed on a left hand side of the vehicle (when viewed from behind) and the right duct can be disposed on a right hand side of the vehicle (when viewed from behind).

The first and second duct inlets can each comprise an inlet aperture which is arranged flush with, or inset from, the plane of the vehicle body, roof, glazing or rear bumper.

The first and second duct inlets can be arranged to draw airflow attached to the lateral vehicle sides into the respective first and second ducts.

The vehicle can comprise a body structure having a roof mounted to first and second front pillars disposed on respective sides of the vehicle; and to first and second rear pillars disposed on respective sides of the vehicle. The front pillars can be the A-pillars of the vehicle. The rear pillars can be the C-pillars or the D-pillars of the vehicle. The first and second rear pillars may extend from the vehicle waistline towards the roof of the vehicle. The vehicle may comprise a glasshouse, wherein the glasshouse comprises said first and second rear pillars.

The first and second duct inlets can be disposed at respective rear corners of the vehicle or at a trailing edge of the roof. The first and second duct inlets can be disposed in front of the respective first and second rear pillars.

The first and second duct outlets can be disposed downstream of a vehicle rear corner or a roof trailing edge. Alternatively, the first and second duct outlets can be disposed behind the respective first and second rear pillars. The first and second ducts can be in the form of pillar ducts.

The first and second ducts can connect the first and second duct inlets to the respective first and second duct outlets. The first and second ducts can each comprise a tubular duct member. Alternatively, the first and second ducts can be formed by a combination of two or more of the following vehicle components: a rear pillar finisher, a rear pillar structure, a vehicle body in white (BIW), and a vehicle glazing panel.

The vehicle can comprise first and second guide vanes disposed at the rear of the respective first and second duct inlets. The first and second guide vanes can be in the form of pillar vanes which are elongated in a vertical direction. The first and second guide vanes can be spaced laterally outwardly from the respective first and second rear pillars. Alternatively, the first and second rear pillars can be configured to form at least an inner surface of said first and second guide vanes.

The first and second guide vanes can be spaced laterally outwardly from the respective first and second rear pillars, such that air flow is directed outboard of the pillars and through the ducts. Alternatively, the first and second rear pillars can be configured to form at least an inner surface of said first and second guide vanes, such that air flow is directed inboard of the pillars and through the ducts.

The first duct inlet can be provided in a left lateral side of the vehicle and the second duct inlet can be disposed in a right lateral side of the vehicle. The first and second duct inlets can be disposed flush with, or inset from, the associated lateral side of the vehicle. The first and second duct inlets can each comprise an upstream edge and a downstream edge. The upstream edge of the first and second duct inlets can be defined by the respective lateral vehicle side. The first and second guide vanes can define the downstream edge of the respective first and second duct inlets. At least a leading edge of the first and second guide vanes can be disposed in line with, or inset from, the upstream edge of the respective first and second duct inlets. At least in certain embodiments, the first and second guide vanes can be arranged so as not to project outwardly beyond the respective lateral sides of the vehicle.

The first and second guide vanes can be spaced laterally outwardly from the respective first and second rear pillars. Alternatively, the first and second rear pillars can be configured to form said first and second pillar guide vanes. For example, the first and second rear pillars could have a sectional profile which defines the pillar guide vanes. A side of the vehicle can be profiled to form an inner surface of the rear duct.

The body structure can comprise first and second rear quarter panels. The first and second rear vanes can extend between said respective first and second rear quarter panels and the roof. A substantially continuous exterior surface can be formed at the interface between said first and second pillar vanes and the respective first and second rear quarter panels.

The first and second duct outlets can extend in a vertical direction (i.e. the first and second duct outlets can be elongated in a vertical direction) such that, in use, the first and second jets of air are elongated in a vertical direction. A width of the first and second duct outlets can be substantially uniform in said vertical direction. Alternatively, a width of the first and second duct outlets can vary in said vertical direction. For example, the width of the first and second duct outlets can decrease towards a top of the respective first and second ducts. In use, the airflow exiting the first and second ducts can be faster (higher energy) towards the top of the duct. The change in width could comprise a stepped change, or could be a continuous change.

The first and second duct inlets can have a larger cross section than the respective first and second duct outlets. Thus, the ducts can each have a converging section towards the rear of the vehicle. Conversely, the first and second duct inlets can have a smaller cross section than the respective first and second duct outlets. Thus, the ducts can each have a diverging section towards the rear of the vehicle. Alternatively, the first and second duct inlets can have substantially the same cross section as the respective first and second duct outlets. Thus, the ducts can each have a uniform section.

The first and second guide vanes can be adapted to direct the jet of air exiting each duct inwardly towards a longitudinal centre line of the vehicle. The first and second guide vanes comprise respective first and second (reference) chord lines extending from a leading edge to a trailing edge thereof. The first and second chord lines are both contained within a horizontal plane and inclined at an angle of incidence relative to a longitudinal axis of the vehicle. The first and second guide vanes can be configured such that the first and second chord lines converge towards a longitudinal centre line of the vehicle in a rearwards direction.

The first and second duct outlets can be disposed at the rear of the vehicle. The first and second duct outlets can be disposed in a rear-facing surface of the vehicle body. The jets of air output from said first and second duct outlets can be introduced directly into the wake formed behind the vehicle. Thus, at least in certain embodiments, the jets of air do not travel over other sections of the vehicle body, such as the boot (trunk) lid or rear engine compartment cover, before influencing the wake. The rear ducts can more effectively control the vehicle wake.

The first and second duct outlets can be arranged in laterally outer positions such that the first and second jets of air initiate at or proximal to the sides of the vehicle. This can increase the efficacy of the jets of air in controlling the formation and/or propagation of the vehicle wake. The first and second duct outlets are disposed on each side of a tailgate. The tailgate can have a generally upright configuration. For example, the vehicle can have an estate (station wagon) configuration having a top-hinged tailgate. Alternatively, the vehicle can be a sports utility vehicle (SUV) or an off-road vehicle.

The vehicle can comprise a transverse aerodynamic member arranged to direct airflow downwardly at the rear of the vehicle to control the vertical propagation of the wake formed behind the vehicle. The transverse aerodynamic member can be in the form of a roof spoiler. The transverse aerodynamic member can be deployable in a rearwards direction.

The apparatus herein is described with reference to a longitudinal axis (X), a transverse axis (Y) and a vertical axis (Z) of the vehicle. References herein to a horizontal plane are to a plane arranged parallel to a reference plane containing the longitudinal axis (X) and the transverse axis (Y). References herein to a vertical plane are to a plane arranged parallel to a reference plane containing the longitudinal axis (X) and the vertical axis (Z) of the vehicle. References herein to a longitudinal centre line of the vehicle refer to a virtual reference line extending parallel to the longitudinal axis (X).

References herein to the front and rear of the vehicle are to rely on the conventional meaning of the terms. The term "forward" (and derivatives thereof) refers to a direction from the rear of the vehicle towards the front of the vehicle. The term "rearward" (and derivatives thereof) refers to a direction from the front of the vehicle towards the rear of the vehicle. The terms "inwardly" and "outwardly" are used herein to define a direction towards or away from a longitudinal centre line of the vehicle. The term "planform" used herein refers to a profile (outline) of the apparatus when viewed in a plan view along the vertical axis (Z).

Furthermore, the apparatus has been described herein with reference to a vehicle. The vehicle can be an automobile, a truck, a lorry, an articulated vehicle and so on. The aerodynamic apparatus described herein could be applied to a trailer to be towed behind a vehicle.

According to some, but not necessarily all examples there is provided a vehicle comprising:
a first duct having a first duct inlet and a first duct outlet; and
a second duct having a second duct inlet and a second duct outlet;

wherein the first and second duct inlets are arranged substantially in line with or inset from respective first and second lateral sides of the vehicle; and the first and second duct outlets are disposed at or proximal to a rear of the vehicle;

the first and second ducts being arranged, in use, to direct respective first and second jets of air inwardly to control the lateral and/or longitudinal propagation of a wake formed behind the vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 2 shows a front perspective view of the vehicle shown in FIG. 1 with the turning vane in a deployed position;

FIGS. 3A-C show perspective views of a vehicle incorporating a deployable profile-changing assembly in accordance with a further embodiment of the present invention;

FIG. 3D shows a perspective of a vehicle incorporate a modified arrangement of the profile-changing assembly shown in FIGS. 3A-C;

FIGS. 4A-C show plan views of a vehicle incorporating the profile-changing assembly in accordance with the further embodiment of the present invention;

FIGS. 5A and 5B illustrate the airflow along a side of the vehicle incorporating the profile-changing assembly according to the further embodiment in a retracted position and in a deployed position;

FIG. 10A shows a side elevation of a vehicle incorporating a pillar guide vane according to a further embodiment of the present invention;

FIGS. 12A and 12B show a first vehicle model and a computational fluid dynamics simulation of the wake formed behind the model;

FIGS. 13A and 13B show a second vehicle model and a computational fluid dynamics simulation of the wake formed behind the model;

FIGS. 14A and 14B show a third vehicle model and a computational fluid dynamics simulation of the wake formed behind the model;

DETAILED DESCRIPTION

Figure 1:
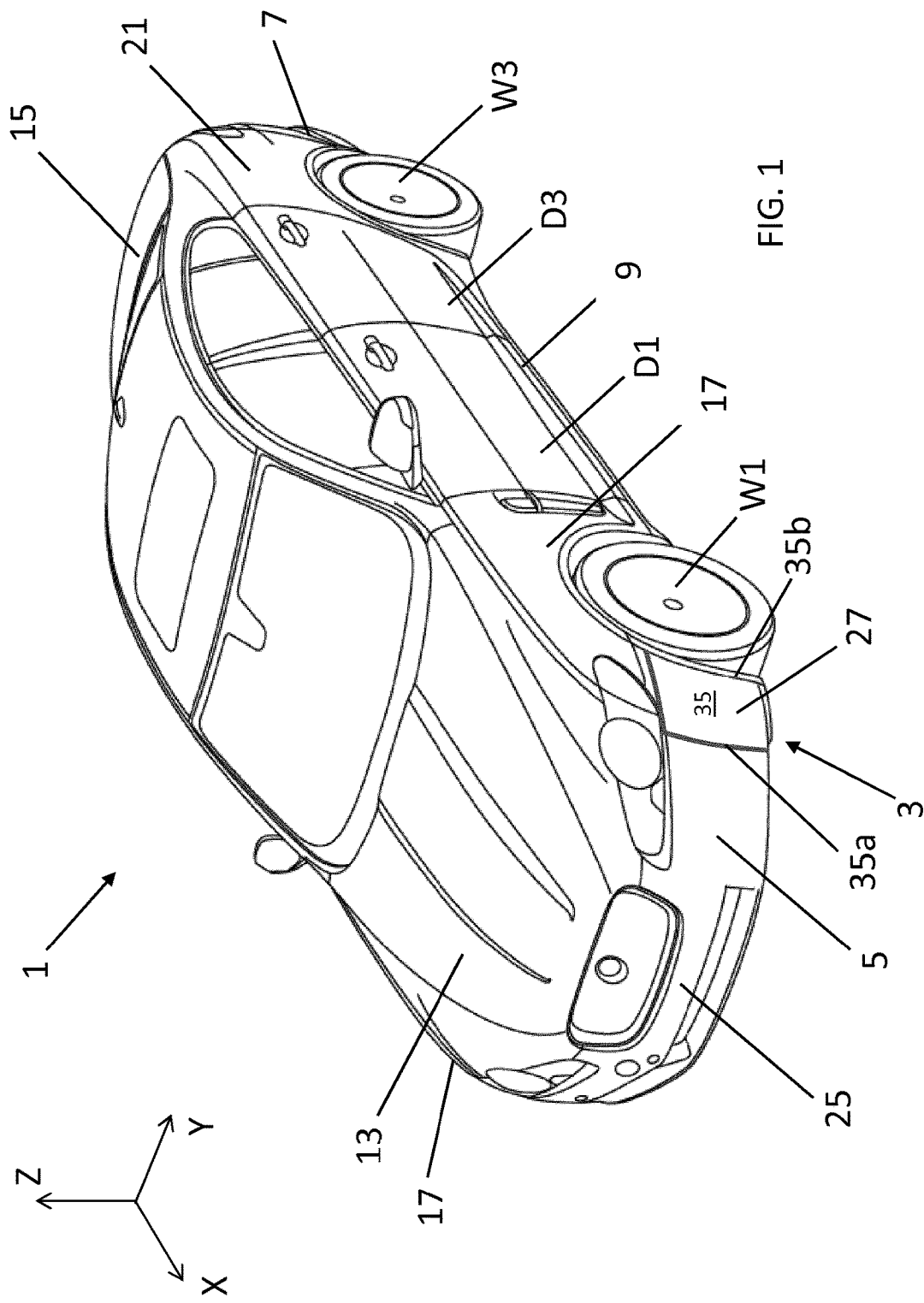
FIG. 1 shows a front perspective view of a vehicle incorporating a deployable turning vane in accordance with an embodiment of the present invention.

A vehicle 1 comprising first and second deployable turning-vane assemblies 3 in accordance with an embodiment of the present invention is illustrated in FIGS. 1 and 2. The first and second turning-vane assemblies 3 are provided on the left and right sides respectively of the vehicle 1.

The first and second turning-vane assemblies 3 are deployable outwardly to modify the planform of the front corners of the vehicle 1 to improve aerodynamic efficiency. The outer surface of each of the first and second turning-vane assemblies 3 is profiled to improve longitudinal airflow along the respective sides of the vehicle 1. In the illustrated arrangement, the vehicle 1 is a motor vehicle having a saloon (sedan) configuration, but the first and second turning-vane assemblies 3 can be employed in other motor vehicle configurations.

The first and second turning-vane assemblies 3 are described herein with reference to a longitudinal axis (X), a transverse axis (Y) and a vertical axis (Z) of the vehicle 1, as shown in FIG. 1. The vehicle 1 comprises a front bumper 5, a rear bumper 7, left and right longitudinal sills 9, a bonnet 13, a boot (trunk) 15, left and right wings (fender) 17, left and right quarter panels 21 left and right front wheels W1, W2, left and right rear wheels W3, W4, and four doors D1-4. The front wheels W1, W2 are disposed in front wheel houses formed in the left and right wings 17; and the rear wheels W3,W4 are disposed in rear wheel houses formed in the left and right quarter panels 21. It will be appreciated that the first and second turning-vane assemblies 3 could be implemented in other vehicle configurations, for example a vehicle 1 having two doors D1, D2.

The front bumper 5 extends across the front of the vehicle 1. The lateral sections of the front bumper 5 curve around the sides of the vehicle 1 thereby defining left and right front corners of the vehicle 1. The first and second turning-vane assemblies 3 are disposed on respective sides of the front bumper 5 at the front corners of the vehicle 1 (where the front of the vehicle 1 undergoes a transition into the vehicle body sides). The front bumper 5 defines an outer surface 25 (i.e. an "A" surface) which, when viewed from above along the vertical axis (Z), defines lateral curves at the front of the vehicle 1. The outer surface 25 of the front bumper 5 has a continuous profile (i.e. the outer surface 25 is formed at least substantially without steps, gaps or other discontinuities) to promote the flow of air around the front of the vehicle 1.

The first and second turning-vane assemblies 3 have the same general configuration, but only the first turning-vane assembly 3 will be described herein for the sake of brevity. The first turning-vane assembly 3 comprises a front guide vane 27 disposed at a vertical position on the vehicle 1 so as to be in line with at least a portion of the front wheel W1. In other words, there is at least a partial overlap in a vertical direction (along the Z-axis) of the front guide vane 27 and the associated front wheel W1 (or the front wheel arch). The front guide vane 27 is vertically elongated and has a curved planform profile. The front guide vane 27 can be selectively displaced between a retracted position (as shown in FIG. 1) and a deployed position (as shown in FIG. 2). In the present embodiment, the front guide vane 27 undergoes lateral translation when it is moved between said retracted and deployed positions. In the present embodiment, the front guide vane 27 translates substantially along the transverse axis Y of the vehicle 1.

At least in certain embodiments the first turning-vane assembly 3 is an active system and one or more actuators (not shown) are provided for displacing the front guide vane 27 between said retracted and deployed positions. The actuators could be electromechanical, pneumatic or hydraulic. In the present embodiment the first and second turning-vane assemblies 3 each comprises an electric drive coupled to a lead screw (not shown) for actuating the front guide vane 27. A control unit (not shown) is provided for controlling operation of said one or more actuators.

The front guide vane 27 is mounted to a front support panel 29 by upper and lower longitudinal struts 31, 33. The outer surface of the front guide vane 27 forms an outer guide surface 35; and an outer surface of the front support panel 29 forms an inner guide surface 37. As shown in FIG. 2, three longitudinal channels 39A-C are formed between the front guide vane 27 and the front support panel 29 by the longitudinal struts 31, 33. The longitudinal channels 39A-C each extend from a front (leading) edge of the front guide vane 27 to a rear (trailing) edge of the front guide vane 27. A top plate 41 and a bottom plate 43 are provided on the front guide vane 27 to prevent the airflow within the longitudinal channels 39A-C mixing with the airflow travelling over the outer guide surface 35. The top and bottom plates 41, 43 could be omitted. It will be appreciated that the first and second turning-vane assemblies could have less than, or more than three longitudinal channels 39A-C.

The outer guide surface 35 and the inner guide surface 37 can have substantially the same profile, or they can have different profiles. The cross-sectional area of each longitudinal channel 39A-C is substantially uniform along its length. In alternate arrangements, the cross-sectional area of the longitudinal channels 39A-C could increase towards the rear of the vehicle 1 to decelerate the airflow travelling between the front guide vane 27 and the front support panel 29. Alternatively, the cross-sectional area of the longitudinal channels 39A-C could decrease towards the rear of the vehicle 1 to accelerate the airflow travelling between the front guide vane 27 and the front support panel 29.

The exit region of each longitudinal channel 39A-C could be profiled to introduce a directional component into the airflow relative to the vehicle 1, for example to direct the airflow laterally inwardly or outwardly. Indeed, the longitudinal channels 39A-C could be profiled to direct the airflow upwardly or downwardly. These arrangements could, for example, facilitate tuning of the flow along the side of the vehicle 1. In the present embodiment, the exit region of each longitudinal channel 39A-C is configured to direct the airflow substantially parallel to the longitudinal axis Y of the vehicle 1.

The control unit for controlling operation of the first and second turning-vane assemblies 3 can be configured to deploy the front guide vane 27 when the speed of the vehicle 1 exceeds a predefined threshold, such as 30 mph. When the vehicle speed is below the predefined threshold, the front guide vane 27 is retained in its retracted position. However, when the vehicle speed exceeds the predefined threshold, the front guide vane 27 is displaced laterally outwardly to its deployed position. Alternatively, the first and second turning-vane assemblies 3 could be configured to deploy the front guide vane 27 when a predefined vehicle dynamic mode is selected, for example a Track or Sport dynamic mode. The first and second turning-vane assemblies 3 could be configured actively to adjust the position of the front guide vane 27 in relation to the front bumper 5, for example based on vehicle speed.

When the front guide vane 27 is in its retracted position, a leading edge 35a of the outer guide surface 35 forms a continuation of the outer surface 25 of the front bumper 5 and a rear (trailing) portion 35b of the outer guide surface 35 is disposed substantially in line with a side of the vehicle. Conversely, when the front guide vane 27 is in its deployed position, it is displaced laterally outwardly from a surrounding area of the front bumper 5 and the rear portion 35b of the outer guide surface 35 is displaced laterally outwardly from the side of the vehicle. The longitudinal channels 39A-C are thereby introduced into the incident airflow when the front guide vane 27 is deployed.

In use, the longitudinal channels 39A-C, the outer guide surface 35 and the inner guide surface 37 are operative to guide the lateral airflow at the front of the vehicle 1 around the front corner of the vehicle 1. The front guide vane 27 controls airflow along the vehicle body side and, at least in certain embodiments, the flow downstream of the front guide vane 27 is modified to suppress the disturbed flow which would otherwise emanate from the respective front wheel houses. The front guide vane 27 can thereby reduce the flow disturbance caused by the rotation of the front wheels W1, W2 resulting in reduced flow disturbances along the vehicle body sides. At least in certain embodiments, the front guide vane 27 can operate to reduce vehicle drag.

The first turning-vane assembly 3 according to the present embodiment has been described as undergoing lateral translation when it is displaced to said deployed position. Alternate deployment mechanisms could be adopted. The front guide vane 27 could be pivotally mounted and undergo a pivoting motion as it travels between said retracted and deployed positions. Alternatively, the front guide vane 27 could undergo a combination of rotation and translation movement as it travels between said retracted and deployed positions.

A vehicle 101 comprising first and second deployable planform-changing assemblies 103 in accordance with a further embodiment of the present invention is shown in FIGS. 3A-C and 4A-C. The first and second planform-changing assemblies 103 are a development of the first and second turning-vane assemblies 3 according to the preceding embodiment. Like reference numerals will be used for like components, albeit incremented by 100 to aid clarity.

The first and second planform-changing assemblies 103 are provided on the left and right sides respectively of the vehicle 101. The first and second planform-changing assemblies 103 have generally the same configuration and only the first planform-changing assembly 103 will be described herein for the sake of brevity.

The first planform-changing assembly 103 comprises a front sub-assembly 145 and a rear sub-assembly 147. The front and rear sub-assemblies 145, 147 are positioned adjacent to each other with the front sub-assembly 145 disposed longitudinally in front of the rear sub-assembly 147. The front sub-assembly 145 comprises a front profiling member 149 which defines a front guide surface 151 forming a section of the outer surface 125 of the front bumper 105. The rear sub-assembly 147 comprises a front guide vane 127 which is broadly equivalent to the front guide vane 27 described herein with reference to the preceding embodiment. The front guide vane 127 is fixedly mounted to a front support panel 129 by a series of longitudinal struts. The outer surface of the front guide vane 127 forms an outer guide surface 135; and an outer surface of the front support panel 129 forms an inner guide surface 137. The front profiling member 149 and the front guide vane 127 are movable independently of each other. The front guide vane 127 is disposed on the vehicle 101 such that there is at least a partial overlap in a vertical direction (along the Z-axis) of the front guide vane 127 and the associated front wheel W1 (or the front wheel arch).

Figure 3A:
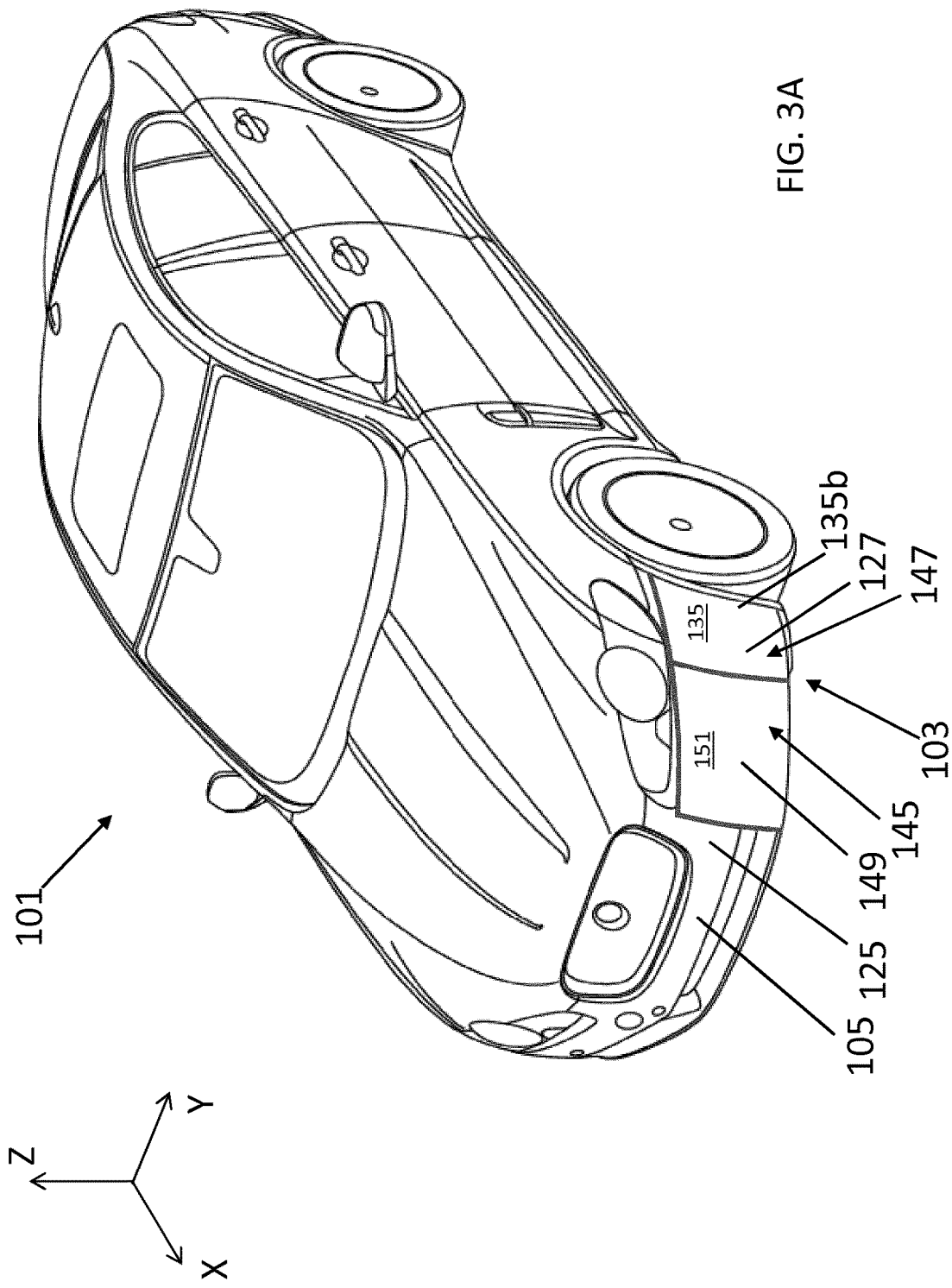

The front profiling member 149 is movable pivotally between a retracted position (as shown in FIGS. 3A and 4A) and a deployed position (as shown in FIGS. 3B, 3C, 4B and 4C). Furthermore, the front guide vane 127 is also movable between a retracted position (as shown in FIGS. 3A, 3B, 4A and 4B) and a deployed position (as shown in FIGS. 3C and 4C). The front guide vane 127 undergoes a combination of lateral translation (along the Y-axis) and pivoting motion (substantially about the Z-axis) as it transitions between said retracted and deployed positions.

When the front profiling member 149 and the front guide vane 127 are both in their retracted positions, the front guide surface 151 and the outer guide surface 135 form a substantially continuous exterior surface defining the outer surface 125 of the front bumper 105. In this configuration, a rear (trailing) portion 135b of the outer guide surface 135 of the front guide vane 127 is arranged substantially in line with a side of the vehicle 101 (typically substantially parallel to the longitudinal axis X).

The front guide vane 127 is located behind the front profiling member 149 and a lap joint is formed to define a substantially continuous exterior surface. In the present embodiment, the front and rear sub-assemblies 145, 147 undergo sequential displacement to their respective deployed or retracted positions. When the front and rear sub-assemblies 145, 147 are deployed, the movement of the front profiling member 149 commences before that of the front guide vane 127. Conversely, when the front and rear sub-assemblies 145, 147 are retracted, the movement of the front guide vane 127 commences before that of the front profiling member 149. The front and rear sub-assemblies 145, 147 comprise actuators (not shown) to enable independent operation of the front guide vane 127 and the front profiling member 149.

Figure 3B:
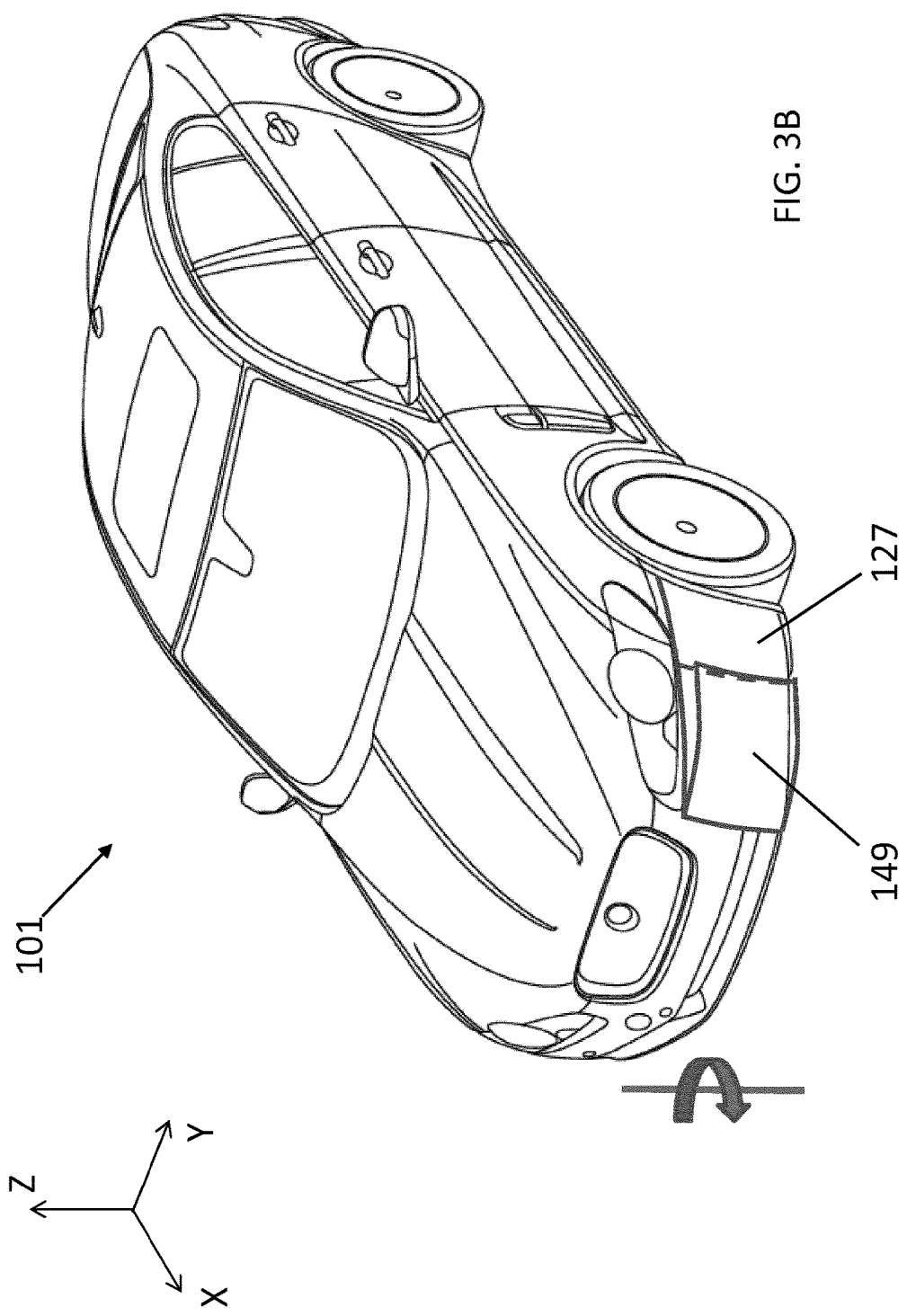

In the present embodiment the pivoting of the front profiling member 149 to its deployed position commences while the front guide vane 127 remains in its retracted position (as shown in FIGS. 3B and 4B). The front guide vane 127 is subsequently displaced to its deployed position by undergoing combined translation and pivoting movement. When deployed, the inner guide surface 137 is arranged to align with the front guide surface 151 to form a substantially continuous exterior surface. Thus, the inner guide surface 137 and the front guide surface 151 modify the planform of the front bumper 105 when they are deployed. The outer guide surface 135 of the front guide vane 127 is displaced laterally outwardly to project beyond the side of the vehicle to provide additional control of the incident airflow.

A control unit can be provided for controlling operation of the first and second deployable planform-changing assemblies 103. The control unit can be configured to deploy the front first and second deployable planform-changing assemblies 103 when the speed of the vehicle 1 exceeds a predefined threshold, such as 30 mph. When the vehicle speed is below the predefined threshold, first and second deployable planform-changing assemblies 103 can be retained in their retracted positions. When the vehicle speed exceeds the predefined threshold, first and second deployable planform-changing assemblies 103 can be displaced to their respective deployed positions. Alternatively, the control unit could be configured to deploy the first and second deployable planform-changing assemblies 103 when a predefined vehicle dynamic mode is selected, for example a Track or Sport dynamic mode. The control unit could be configured actively to adjust the position of the first and second deployable planform-changing assemblies 103, for example based on vehicle speed.

The operation of the second planform-changing assembly 103 will now be described with reference to FIGS. 5A and 5B.

The airflow around the vehicle 101 with the second planform-changing assembly 103 retracted is illustrated in FIG. 5A. The airflow tends to separate at the front of the vehicle due to the change in direction as the airflow undergoes a transition from a lateral flow direction to a longitudinal flow direction at the corner. The resulting airflow along the vehicle body side is dominated by vortices and turbulent flow.

The airflow around the vehicle 101 with the second planform-changing assembly 103 deployed is illustrated in FIG. 5B. When both the front guide vane 127 and the front profiling member 149 are deployed, the outer surface 125 of the front bumper 105 forms a substantially continuous exterior surface. A region of increased suction is realised on the forward facing surfaces of the front guide vane 127 and the front profiling member 149. As a consequence, the airflow remains attached to the surface of the vehicle 1 and is guided around the front corner by the front guide vane 127. The area of flow separation is reduced allowing a reduction in the related energy losses. The velocity of the airflow closer to the vehicle body sides is increased compared to the scenario when the planform-changing assembly 103 is not deployed. The width of the wake downstream of the vehicle 1 is reduced resulting in a reduction in the drag of the vehicle. By controlling airflow around the vehicle 1, the front planform-changing assembly 103 can help to reduce the deposition (total or rate) of surface contaminants on the vehicle body side, for example on the Body-In-White, cladding, mouldings handles or lamp covers.

In an alternate arrangement, the front guide vane 127 could be movable to an intermediate position in which the outer guide surface 135 of the front guide vane 127 forms a continuation of the front profiling member 149 in its deployed position. In a further arrangement (illustrated in FIG. 3D), the inner guide surface 137 can be omitted such that the front guide vane 127 deploys to form a continuation of the front guide surface 151. In both of these arrangements the planform of the front bumper 105 can be changed to control airflow along the side of the vehicle. This functionality is believed to be patentable in its own right.

It will be appreciated that the planform-changing assembly 103 described herein can be modified. For example, the front and rear sub-assemblies 145, 147 could be combined. The deployable mechanism could consist of a single sub-assembly, for example pivoting about an axis proximal its leading edge. A further alternative would be to implement more than two sections, for example to accommodate deployed configurations having a different profile. A still further alternative would be to use a morphing surface, for example a bi-stable surface. A yet further alternative would be to use a flexible material to define the outer surface 125 of the front bumper 105.

Figure 6A:
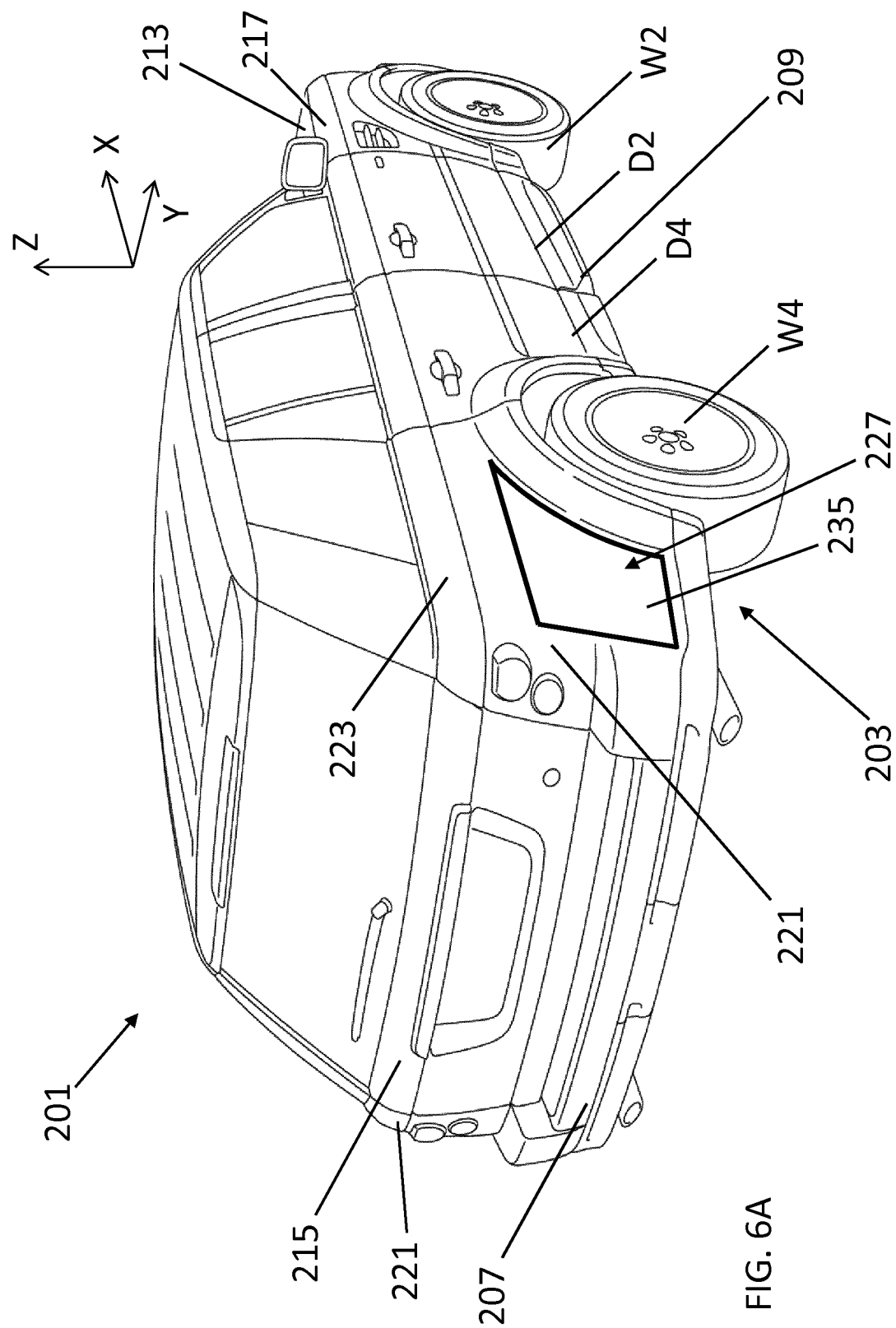
FIGS. 6A-C show perspective views of the rear quarter of a vehicle incorporating a deployable rear guide vane in according with a further embodiment of the present invention.
Figure 6B:
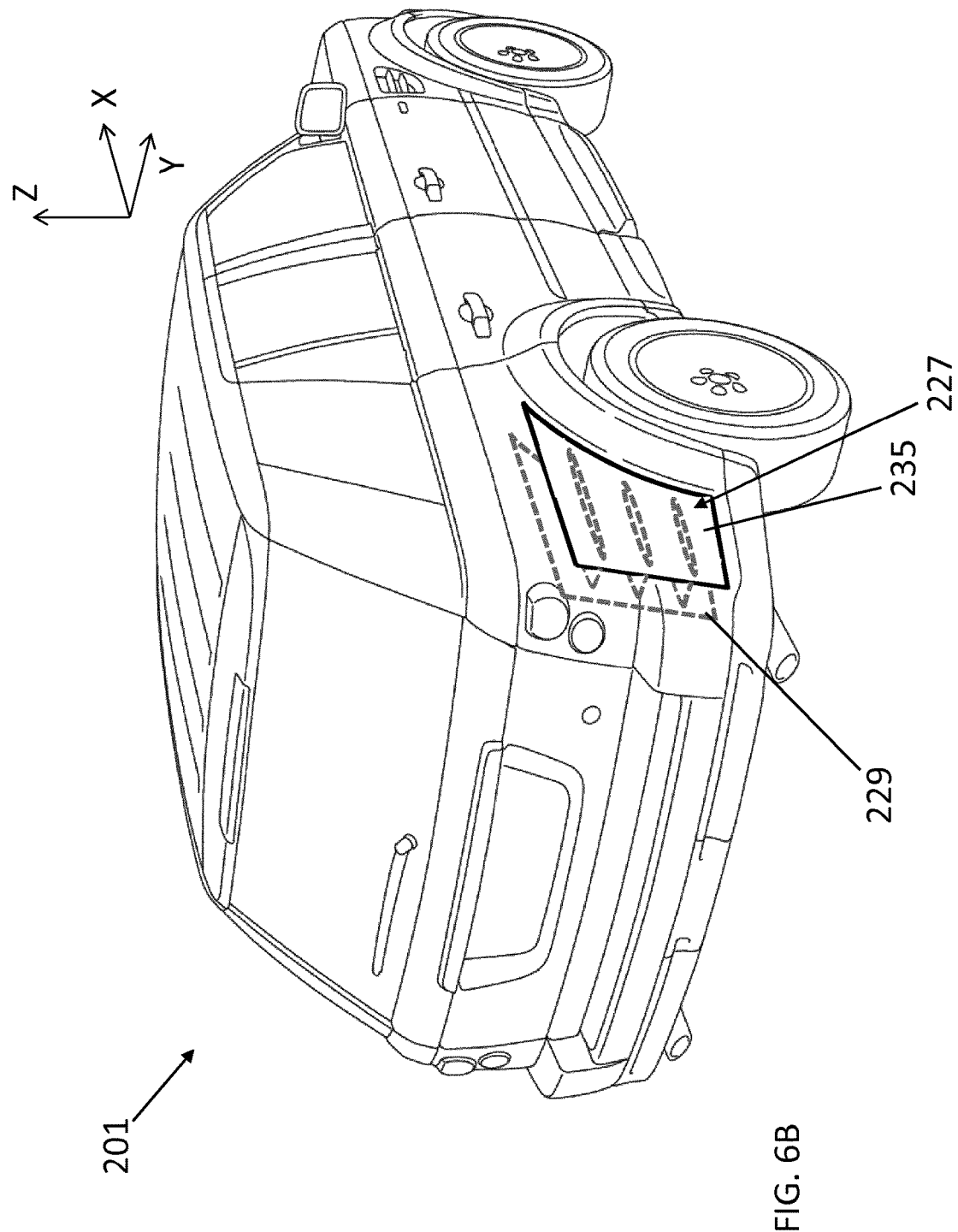
Figure 6C:
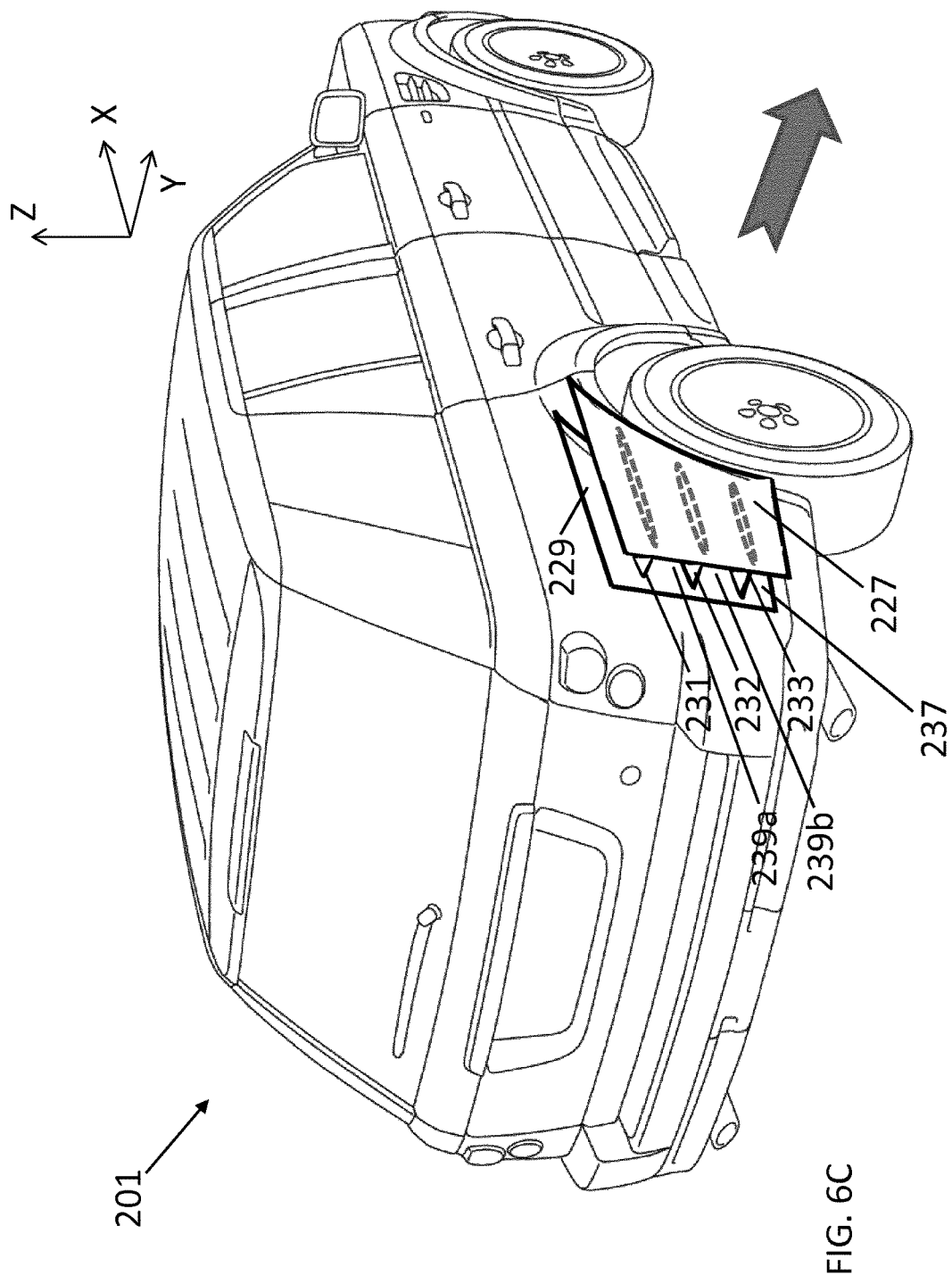
Figure 7A:
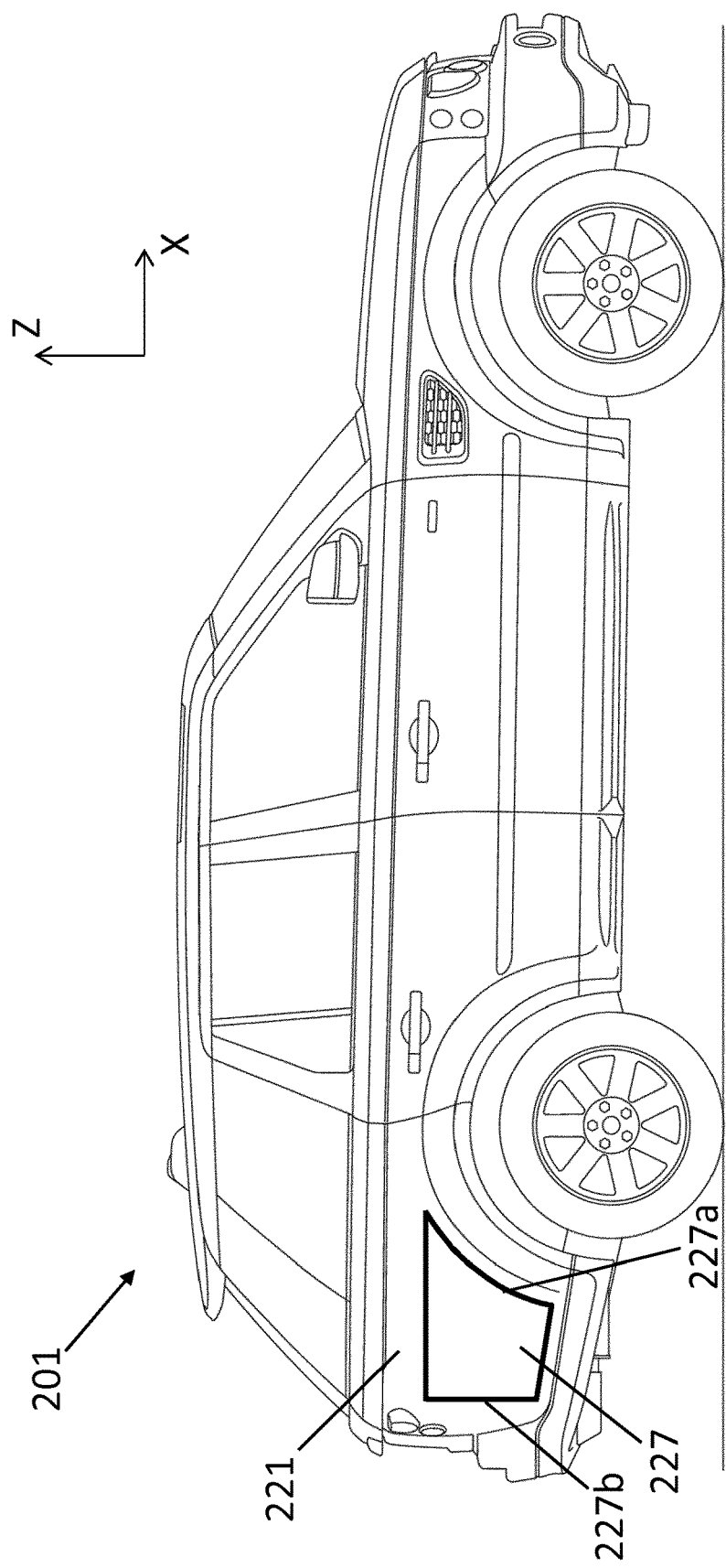
FIG. 7A shows a side elevation of the vehicle shown in FIGS. 6A-C with the rear guide vane in a deployed configuration.
Figure 7B:
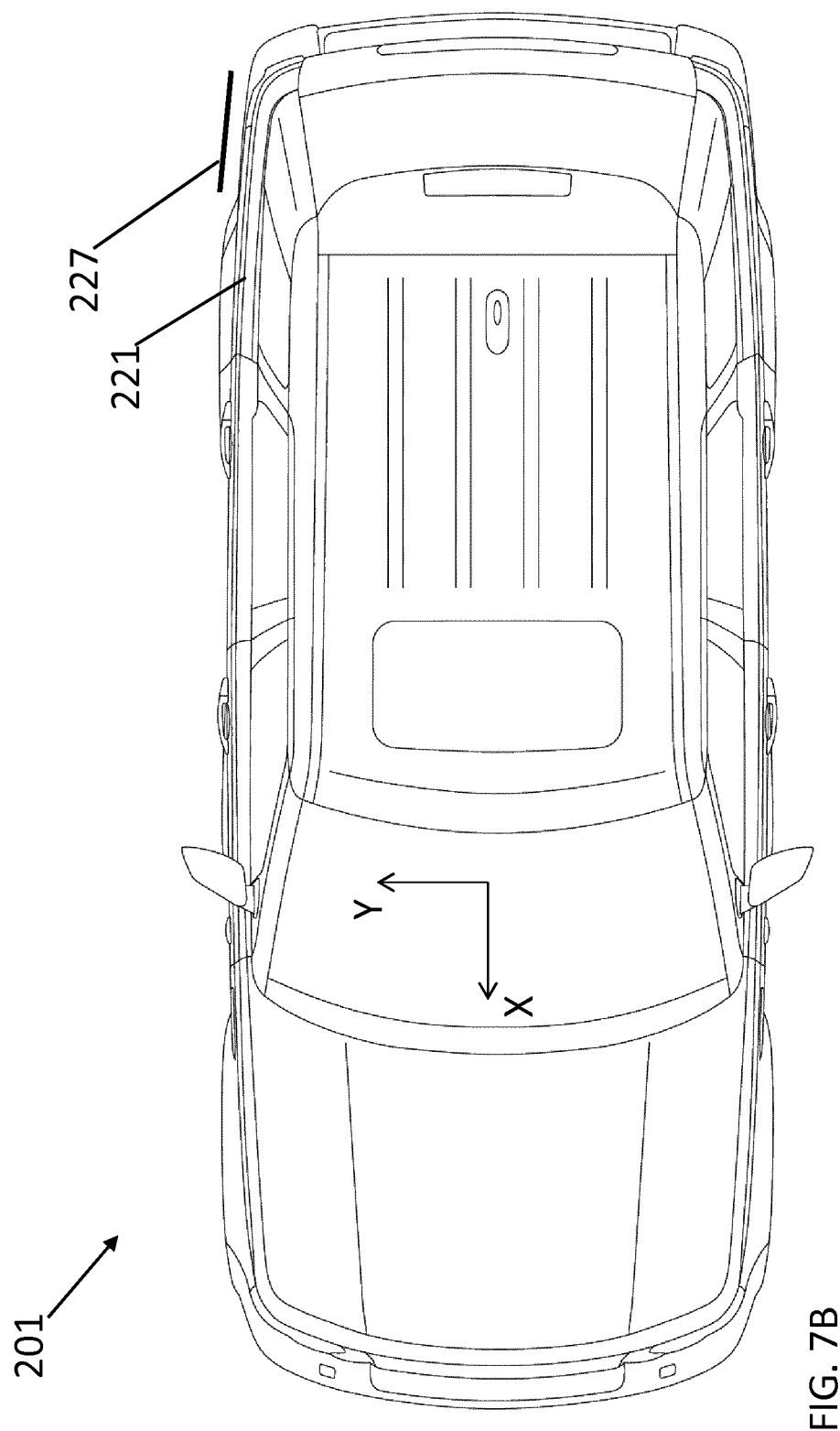
FIG. 7B shows a plan view of the vehicle shown in FIGS. 6A-C with the rear guide vane in a deployed configuration.

A vehicle 201 comprising first and second rear fender assemblies 203 in accordance with a further embodiment of the present invention is illustrated in FIGS. 6, 7 and 8. At least in certain embodiments, the rear fender assemblies 203 are arranged to provide a surface to which the airflow can re-attach in order to reduce the wake downstream of the vehicle 201. The first and second rear fender assemblies 203 in the present embodiment are selectively deployable, but they could have a fixed configuration. The description is with reference to a longitudinal axis (X), a transverse axis (Y) and a vertical axis (Z) of the vehicle 201.

The vehicle 201 comprises a front bumper, a rear bumper 207, left and right sills 209, a bonnet 213, a tailgate 215, left and right wings (fender) 217, left and right quarter panels 221, left and right front wheels W1, W2, left and right rear wheels W3, W4, and four doors D1-4. The front wheels W1, W2 are disposed in front wheel houses formed in the left and right wings 217; and the rear wheels W3, W4 are disposed in rear wheel houses formed in the left and right quarter panels 221.

The first and second rear fender assemblies 203 are disposed in the left and right quarter panels 221 respectively and are positioned behind the rear wheels W3, W4. Only the second rear fender assembly 203 (provided on the right-hand side of the vehicle 201) is visible in the Figures and, therefore, the second rear fender assembly 203 will be described herein. It will be appreciated that the first rear fender assembly 203 has a corresponding configuration, albeit disposed on the left-hand side of the vehicle 201.

The second rear fender assembly 203 comprises a rear guide vane 227 which is deployable to provide a surface to which the airflow at the rear of the vehicle 1 can re-attach. The rear guide vane 227 can thereby guide the airflow at the rear of the vehicle 1 to reduce the size of the wake downstream of the vehicle 1. The rear guide vane 227 has a front (leading) edge 227a and a back (trailing) edge 227b. In the present embodiment, the front edge 227a is profiled to match a rear section of the wheel arch formed around the wheel housing. It will be appreciated, therefore, that the rear guide vane 227 could be profiled to include a section of the wheel arch trim.

The rear guide vane 227 is mounted to a rear support panel 229 by three longitudinal struts 231, 232, 233. The rear fender assembly 203 is operable selectively to displace the rear guide vane 227 between a retracted position (as shown in FIG. 6A) and a deployed position (as shown in FIG. 6C). In the present embodiment, the rear guide vane 227 undergoes lateral translation along the transverse axis Y when it is moved between said retracted and deployed positions. An actuator is disposed in the vehicle 1 actively to displace the rear support panel 229 between said retracted position and said deployed position.

The rear guide vane 227 is spaced apart from the rear support panel 229. The outer surface of the rear guide vane 227 forms a first outer surface in the form of an outer guide surface 235; and an outer surface of the rear support panel 229 forms a second outer surface in the form of an inner guide surface 237. As shown in FIG. 6C, two longitudinal channels 239A, 239B are formed between the rear guide vane 227 and the rear support panel 229 by the longitudinal struts 231, 232, 233. The longitudinal channels 239A, 239B each extend from a front (leading) edge 227a of the rear guide vane 227 to a back (trailing) edge 227b of the rear guide vane 227. A top end plate and a bottom end plate can optionally be provided on the rear guide vane 227. When the rear guide vane 227 is deployed, the inner guide surface 237 forms a continuation of the surrounding region of the right quarter panel 221.

The rear guide vane 227 is disposed behind the rear wheel W3 to provide a surface to which the turbulent air expelled from the rear wheel housing can re-attach. To provide a suitable surface for re-attaching the turbulent airflow, the rear guide vane 227 is disposed below a waistline (beltline) of the vehicle (which defines a transition from the side body panels to the glasshouse). In the present embodiment, the rear guide vane 227 is disposed at a vertical height on the vehicle 1 such that it is positioned in line with at least a portion of the rear wheel W3. Thus, there is at least a partial overlap in a vertical direction (along the Z-axis) of the rear guide vane 227 and the associated rear wheel W3 (or the rear wheel arch). When deployed, at least the leading edge 227a of the rear guide vane 227 extends into the turbulent airflow expelled from the rear wheel housing and/or the rear wheel W3. In use, the airflow emanating from the rear wheel housing re-attaches to the outer guide surface 235 of the rear guide vane 227. The rear guide vane 227 is configured to guide the airflow at the rear of the vehicle 201 to reduce aerodynamic drag of the vehicle 1. Specifically, the rear guide vane 227 is inclined at an angle relative to the longitudinal axis X to guide the local airflow inwardly towards a centre line of the vehicle 201.

In the present embodiment, the rear guide vane 227 is arranged such that the outer guide surface 235 is oriented to guide the airflow inwardly (towards a centre line of the vehicle 201). The flow downstream of the rear guide vane 227 is thereby directed inwardly which can, at least in certain embodiments, provide a 'boat tail' rear planform for the vehicle, thereby reducing drag. The trailing edge 227b of the rear guide vane 227 also defines a consistent separation point for the attached airflow which provides uniform flow control across a wider range of conditions. This is in contrast to prior art arrangements in which the separation of the airflow around a curved surface (such as the rear corner of the vehicle) results in greater variability. It will be appreciated that, at least in certain embodiments, the first and second rear fender assemblies 203 are operative to reduce aerodynamic drag on the vehicle. This has particular application in vehicles having pronounced wheel arches, such as a sports utility vehicle (SUV) or an off-road vehicle.

The rear guide vane 227 has a deployed position in which it functions as a turning vane to guide the airflow inwardly behind the vehicle 201 to control the vehicle wake. The rear support panel 229 locates in the aperture left by the movement of the rear guide vane 227.

When deployed, the rear guide vane 227 delivers a more aerodynamically favourable rear quarter profile which can attach flow downstream of the rear wheel arch and also separate the airflow cleanly and predictably off the rear of the vehicle 201.

The rear guide vane 227 could optionally travel forwards towards the wheel W3 to locate within the turbulent airflow expelled laterally from the wheel housing. This arrangement would potentially reduce the lateral displacement required to position the rear guide vane 227 in relation to the wheel housing. The rear guide vanes 227 disposed on each side of the vehicle could be controlled independently, for example to compensate for changes due to rear wheel steering and/or crosswinds.

Figure 8A:
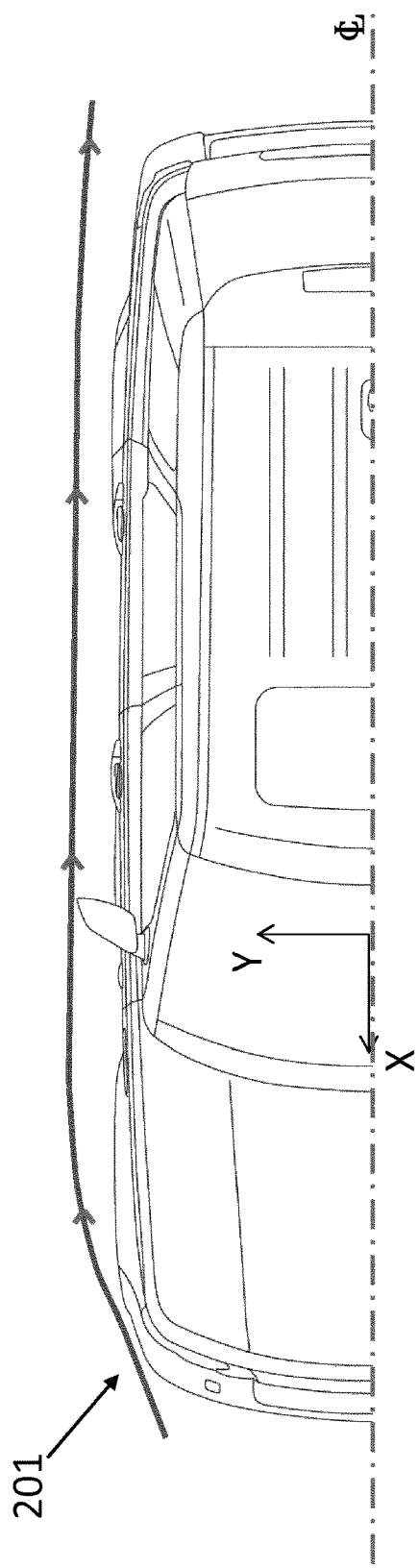
FIGS. 8A and 8B illustrate the airflow along a side of the vehicle incorporating the rear guide vane shown in FIGS. 6A-C respectively in retracted and deployed positions.

The channel formed between the rear guide vane 227 and the inner surface 237 and the A-surface can be uniform along its length or can be converging. If the channel converges towards the rear of the vehicle 201, the resulting (relatively) high velocity air jet can be used to constrain/reduce the extent of the wake downstream of the vehicle 201. Alternatively, a diverging channel may be used to reduce the drag associated with the rear guide vane 227. When the rear guide vane 227 is retracted, the outer guide surface 235 is disposed substantially flush with the surrounding surface of the rear quarter of the vehicle. Thus, the outer surface of the rear quarter has a substantially continuous exterior surface which is free from steps or discontinuities. The airflow around the vehicle 1 with the rear guide vane 227 retracted is illustrated in FIG. 8A. The airflow travels along the vehicle body sides and separates at the rear of the vehicle 201 to form a wake downstream thereof. A reduction in the width of the vehicle 201 towards the rear can help to reduce the size of the wake to reduce aerodynamic drag. However, the rotation of the rear wheels W3, W4 tends to pump air out of the rear wheel houses which does not re-attach to the downstream surfaces of the left and right quarter panels 221. The air expelled from the wheel houses tends to be directed laterally outwardly which increases the wake of the vehicle 1.

Figure 8B:
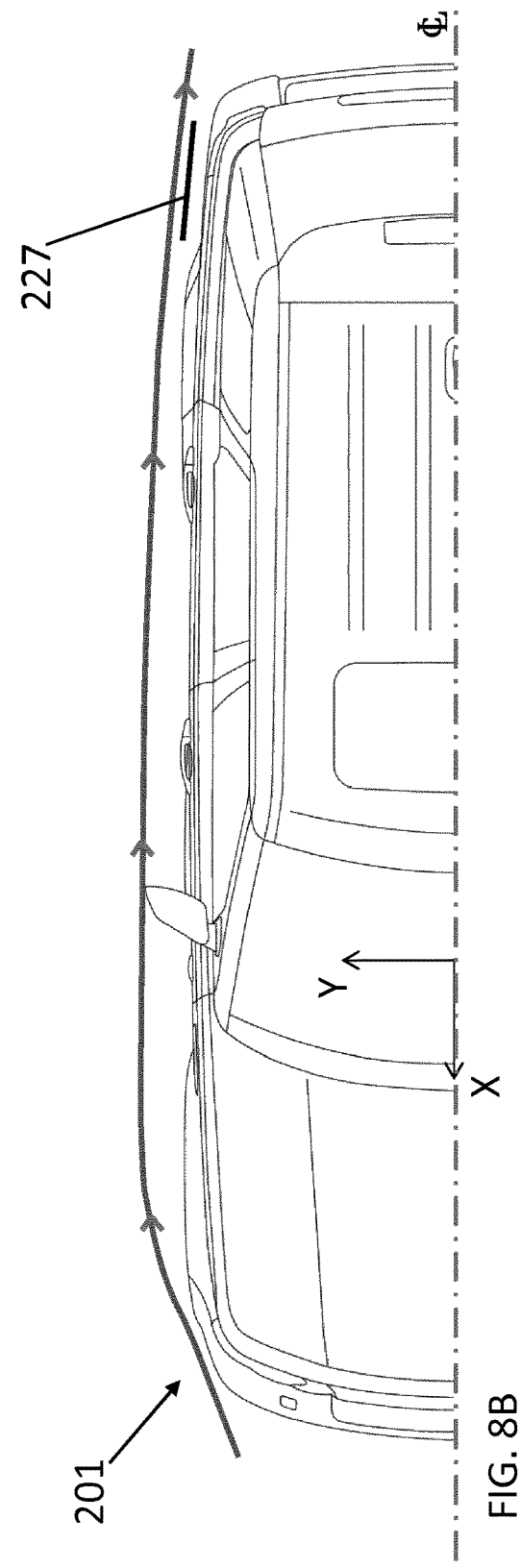

The airflow around the vehicle 1 with the rear guide vane 227 deployed is illustrated in FIG. 8B. The rear guide vane 227 is displaced laterally outwardly of the right quarter panel 221 and rotates about a vertical axis (arranged substantially parallel to the vertical axis Z in the present embodiment). When deployed, the rear guide vane 227 is disposed within the path of the air expelled from the rear wheel houses. The expelled air flows over the rear guide vane 227 and re-attaches to the outer guide surface 235. The rear guide vane 227 is oriented to guide the airflow inwardly towards a longitudinal centre-line of the vehicle 201, as illustrated in FIG. 8B.

The rear guide vane 227 can provide a clearly defined boundary layer flow separation edge suitable for controlling the size of the vehicle wake. The rear guide vane 227 can also promote pressure recovery, thereby reducing drag and potentially enhance lateral stability at low yaw angles, particularly for vehicles with large rear corner radii. The rear guide vane 227 can help to reduce the deposition (total or rate) of surface contaminants at the rear of the vehicle, for example on the rear surfaces, for example the Body In White, tail gate, lift gate, glazing cladding, mouldings, handles or lamp covers.

The first and second rear fender assemblies 203 are believed to be patentable independently of the other arrangements described herein. However, the first and second rear fender assemblies 203 have particular application in combination with the turning-vane assemblies 3 and/or the planform-changing assemblies 103 described herein. The turning-vane assemblies 3; and the planform-changing assemblies 103 promote the linear flow of air along the vehicle body sides, thereby reducing the vehicle wake. The first and second rear fender assemblies 203 can also operate to reduce or control the wake behind the vehicle 201.

The rear guide vane 227 has been described as undergoing translation in a lateral direction and rotation about a vertical axis as it is deployed. It will be appreciated that the rear guide vane 227 could undergo additional movements as it travels between said deployed and retracted positions. For example, the angular orientation of the rear guide vane 227 in relation to the longitudinal axis X of the vehicle 201 could alter as it is deployed.

A control unit can be provided for controlling operation of the first and second rear fender assemblies 203. The control unit can, for example, be configured to deploy the rear guide vane 227 when the speed of the vehicle 1 exceeds a predefined threshold, such as 30 mph. Alternatively, the first and second rear fender assemblies 203 could be configured to deploy the rear guide vanes 227 when a predefined vehicle dynamic mode is activated, for example a Track or Sport dynamic mode. The first and second rear fender assemblies 203 could be configured actively to adjust the angular position and/or relative position of the associated rear guide vane 227, for example based on vehicle speed.

Figure 9A:
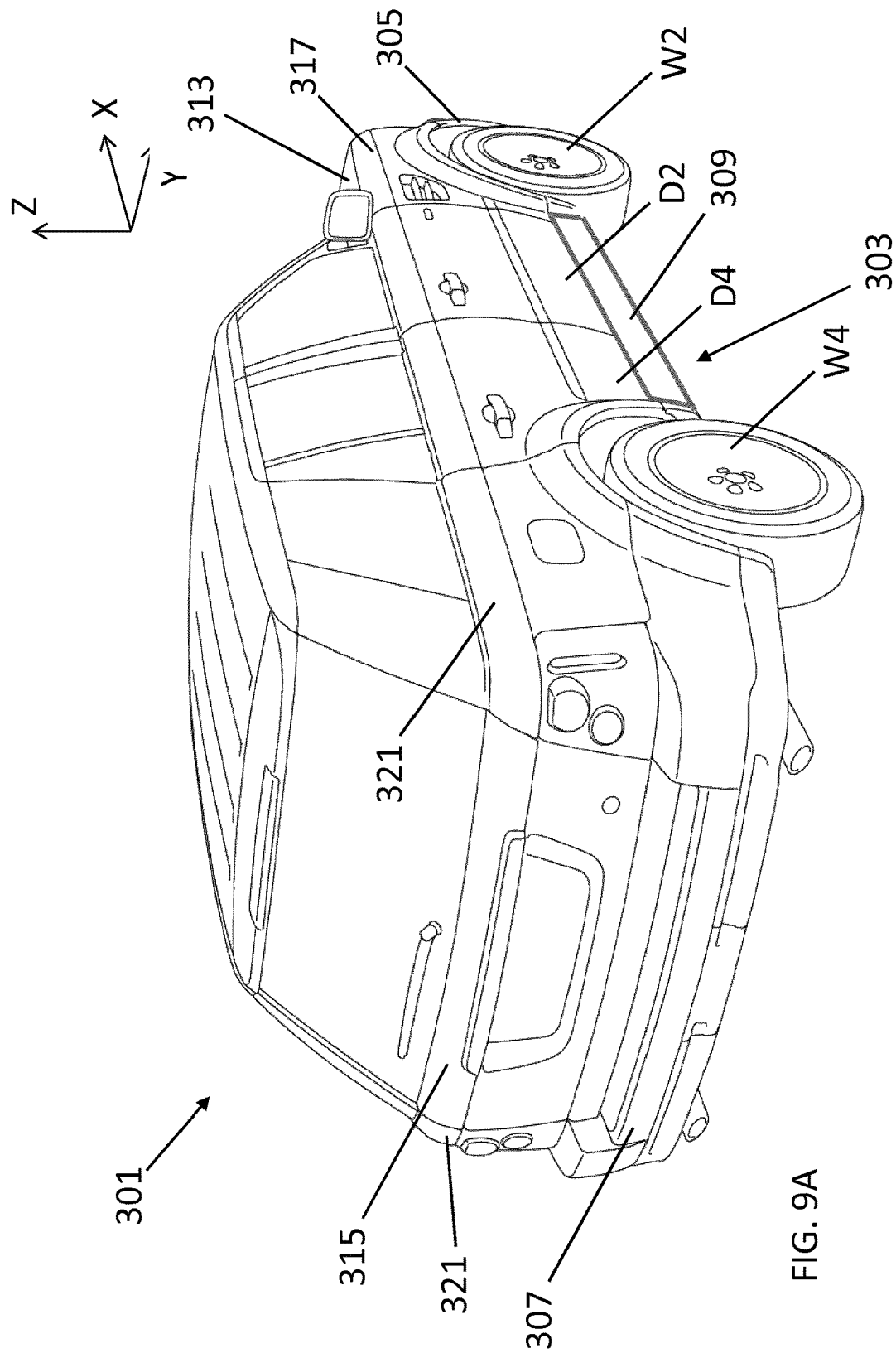
FIGS. 9A and 9B show perspective views of a vehicle incorporating a deployable sill according to a further embodiment of the present invention.
Figure 9B:
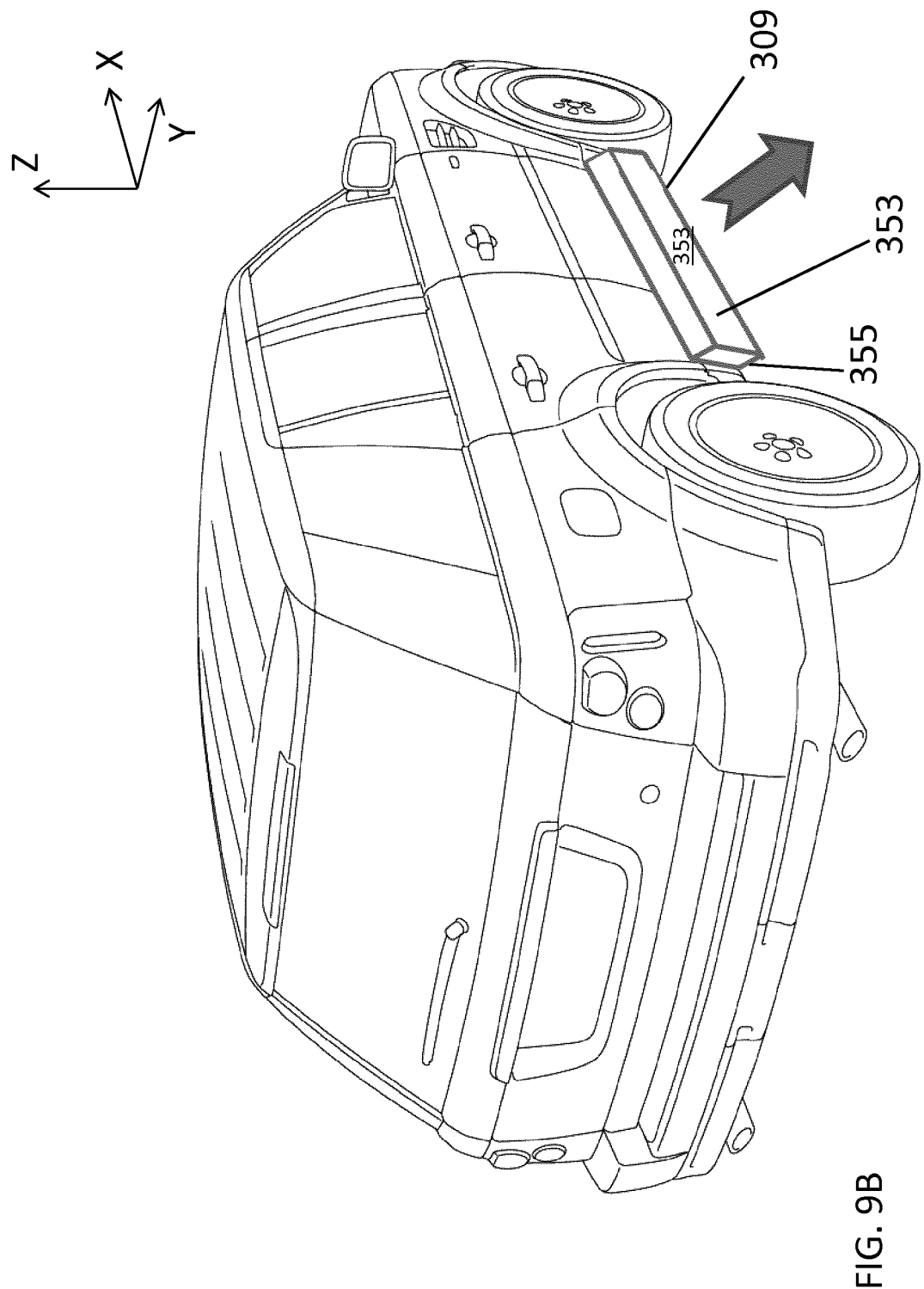

A vehicle 301 incorporating left and right deployable sill assemblies 303 in accordance with a still further aspect of the present invention will now be described with reference to FIGS. 9A and 9B. The vehicle 301 is a development of the vehicle 201 according to the preceding embodiment described herein. Accordingly, like reference numerals will be used for like components, albeit incremented by 100 to aid clarity.

The vehicle 301 comprises a front bumper 305, a rear bumper 307, left and right sills 309, a bonnet 313, a tailgate 315, left and right wings (fenders) 317, left and right quarter panels 321, left and right front wheels W1, W2, left and right rear wheels W3, W4, and four doors D1-4. The front wheels W1, W2 are disposed in front wheel houses formed in the left and right wings 317; and the rear wheels W3,W4 are disposed in rear wheel houses formed in the left and right quarter panels 321.

The left and right sills 309 extend longitudinally between the front and rear wheels W1, W3; W2, W4 on the respective sides of the vehicle 301. The left and right sills 309 each comprise a vertical section (sidewall) 353 and a lower transverse section 355. The left and right sills 309 can be displaced between a retracted position (as shown in FIG. 9A) and a deployed position (as shown in FIG. 9B). When the left and right sills 309 are retracted, they nest around the vehicle body structure such that the outer surface of the vertical section 353 and the adjacent body structure align to form a substantially continuous exterior surface, such as the bottom of the doors D1-D4. When the left and right sills 309 are deployed, they undergo translation laterally outwardly and downwardly partially filling the longitudinal space between the front and rear wheels.

A control unit (not shown) is provided for controlling the deployment of the left and right sills 309. The left and right sills 309 are intended to provide an active aerodynamic aid to reduce the drag of the vehicle 301 whilst it is moving. As such, the control unit is configured to displace the left and right sills 309 only when the vehicle is moving. The control unit can, for example, be configured to deploy the left and right sills 309 only when the vehicle 301 speed exceeds a predetermined threshold, for example 30 mph. Below this speed, or when the vehicle 301 is stationary, the control unit is configured to retract the left and right sills 309. The control unit could optionally also be configured to deploy the left and right sills 309 when the vehicle is stationary to provide a step to facilitate ingress to and/or egress from the vehicle 301.

At least in certain embodiments the left and right deployable sill assemblies 303 can help to control the airflow along respective sides of the vehicle 301. For example, the left and right sills 309 can be deployed laterally to help reduce the outflow of air from under the vehicle 301, thereby potentially improving the performance of a rear diffuser can be improved. Furthermore, the lateral displacement of the left and right sills 309 can promote flow reattachment aft of the front wheels W1, W2 through the provision of a suitable outboard surface. In particular, when the left and right sills 309 are deployed, an outer surface of the vertical section 353 is disposed in the turbulent airflow expelled from the front wheels W1, W2 and/or the front wheel housings. This turbulent flow re-attaches to the outer surface and the flow conditions onto/over the rear wheels W3, W4 can potentially be improved. The provision of deployable left and right sills 309 (rather than fixed sills) also allows the vehicle 301 to retain a waisted profile (i.e. a mid-section having a reduced cross-sectional area).

The left and right sills 309 can promote flow reattachment downstream of the front wheels W1, W2 of the vehicle 301, thereby improving the flow condition onto the rear wheels W3, W4. The outflow from under the vehicle 301 can also be reduced, potentially improving the performance of a rear diffuser (not shown).

The left and right deployable sill assemblies 303 described herein are believed to be patentable independently of the other arrangements described herein. However, it will be appreciated that the left and right deployable sill assemblies 303 can be combined with one or more of the other assemblies described herein. For example, the deployable sill assemblies 303 can be combined with the turning-vane assemblies 3 and/or the planform-changing assemblies 103 and/or the rear fender assemblies 203.

A vehicle 401 incorporating left and right rear pillar ducts 457 in accordance with a still further aspect of the present invention will now be described with reference to FIGS. 10 to 14. The vehicle 401 is a development of the vehicle 201 described herein with reference to FIG. 6. Accordingly, like reference numerals will be used for like components, albeit incremented by 200 to aid clarity.

As shown in FIG. 10A, the vehicle 401 comprises a rear bumper 407, a bonnet 413, a tailgate 415, left and right wings (fenders) 417, left and right rear quarter panels 421, left and right front wheels W1, W2, left and right rear wheels W3, W4, and four doors D1-4. The front wheels W1, W2 are disposed in front wheel houses formed in the left and right wings 417; and the rear wheels W3, W4 are disposed in rear wheel houses formed in the left and right rear quarter panels 421.

Figure 10B:
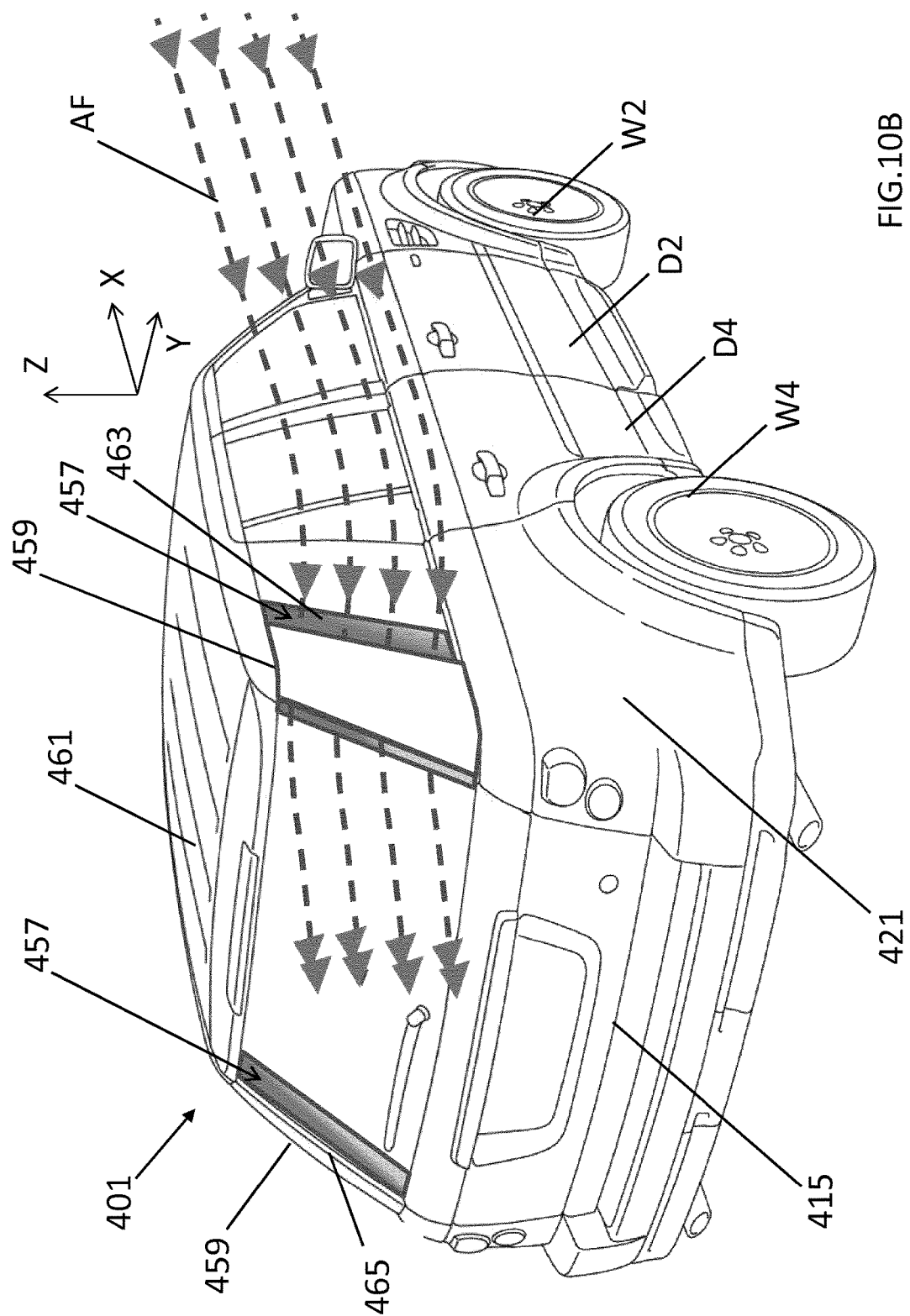
FIG. 10B shows a rear perspective view of the vehicle shown in FIG. 10A.

The vehicle body structure comprises an A-pillar (A), a B-pillar (B), a C-pillar (C) and a D-pillar (D), all of which extend from a vehicle waistline 423 up to a roof 461 mounted on the pillars. As shown in FIG. 10B, left and right rear pillar vanes 459 are disposed at the rear of the vehicle 401 proximal to the D-pillars (D) on each side of the vehicle 401. In the present embodiment, the D-pillars (D) are inset from the sides of the vehicle and the left and right rear pillar vanes 459 are each disposed laterally outwardly of the associated D-pillar (D) to form the left and right rear pillar ducts 457. The left and right rear pillar vanes 459 are elongated in a vertical direction and extend between the top of the respective left and right rear quarter panels 421 and the roof 461 of the vehicle 401. In the present embodiment, the left and right rear pillar vanes 459 extend vertically upwardly from the respective left and right rear quarter panels 421 to form a continuous exterior surface. An outer surface 463 of the D-pillar (D) defines an inner sidewall of the respective rear pillar duct 457 and an inner surface 465 of the rear pillar vane 459 defines an outer sidewall of the rear pillar duct 457. In the present embodiment, the orientation of the left and right rear pillar vanes 459 is fixed in relation to the associated D-pillar (D), but alternate arrangements could comprise movably mounted rear pillar vanes 459, for example to deploy in a lateral direction. The rear pillar vanes 459 are non-structural in the present embodiment, but they could be formed as a structural component of the vehicle body structure. For example, the rear pillar vanes 459 could form a structural component which reinforces the D-pillar; or the D-pillar and the rear pillar vane 459 could be combined on each side of the vehicle 401.

Figure 10C:
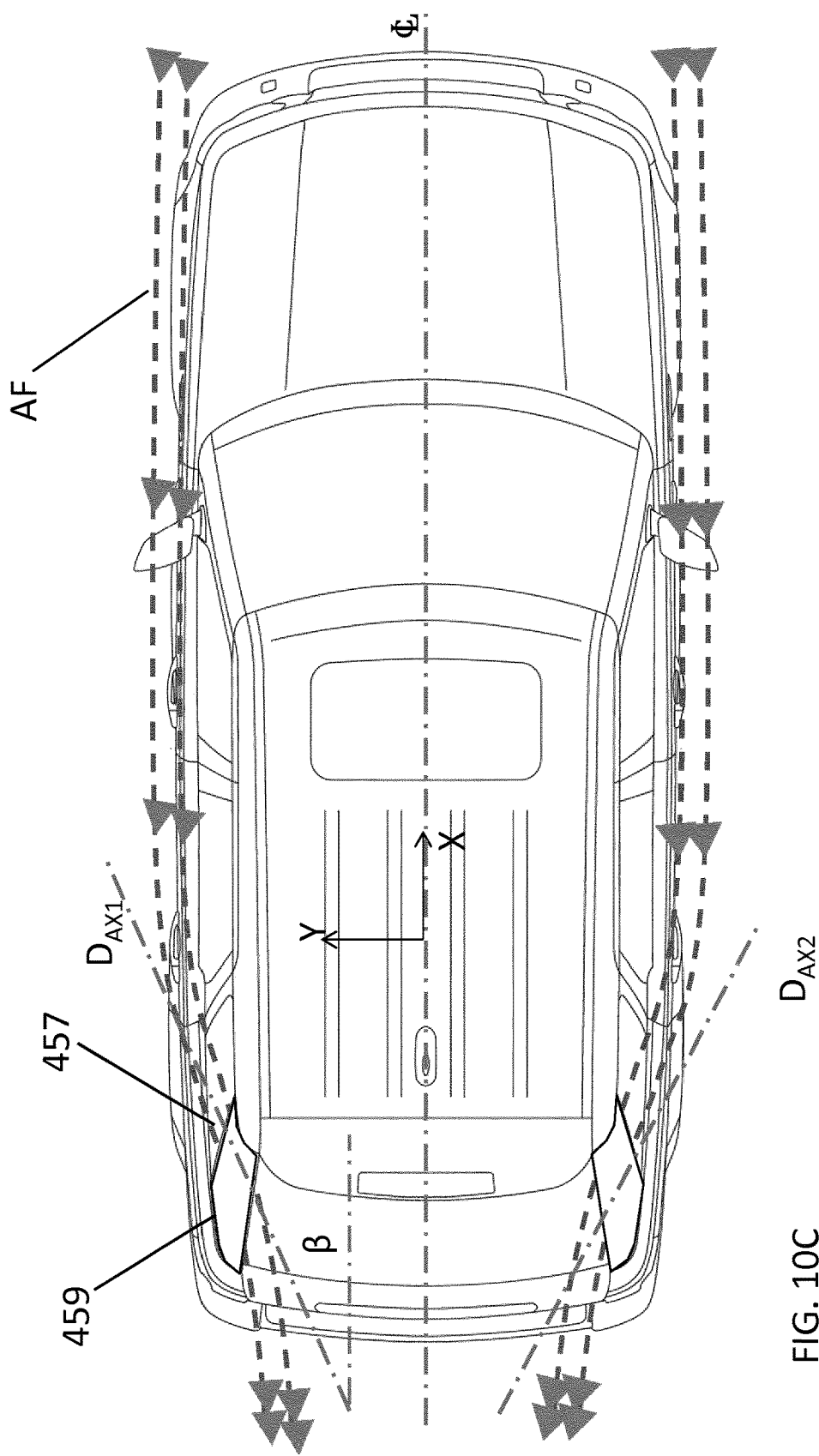
FIG. 10C shows a plan view of the vehicle shown in FIG. 10A.

In the present embodiment, the outer surface 463 of the D-pillar (D) and the inner surface 465 of the associated rear pillar vane 459 converge towards each other as they extend towards the rear of the vehicle 401. Thus, the left and right rear pillar ducts 457 each have a converging section which, in use, accelerates the entrained airflow and a jet of air is expelled therefrom. The resulting jet of air is elongated in a vertical direction. The sides of the vehicle 401 may converge inwardly towards the roof 461 and the left and right rear pillar ducts 457 may follow this profile to form a pair of vertically-elongated jets of air which converge inwardly towards their upper ends (i.e. are inclined relative to a vertical axis Y of the vehicle 401). The airflow through the left and right rear pillar ducts 457 is illustrated in FIGS. 10B and 10C by dashed lines (AF) and arrowheads represent the speed of the airflow (a single arrowhead representing relatively slow airflow upstream of the rear pillar duct 457 and a double arrowhead representing relatively fast airflow downstream of the rear pillar duct 457). A variant could comprise a diverging duct (which opens outwardly towards the rear of the vehicle) to reduce the aerodynamic drag resulting from the rear pillar vanes 459.

Figure 11:
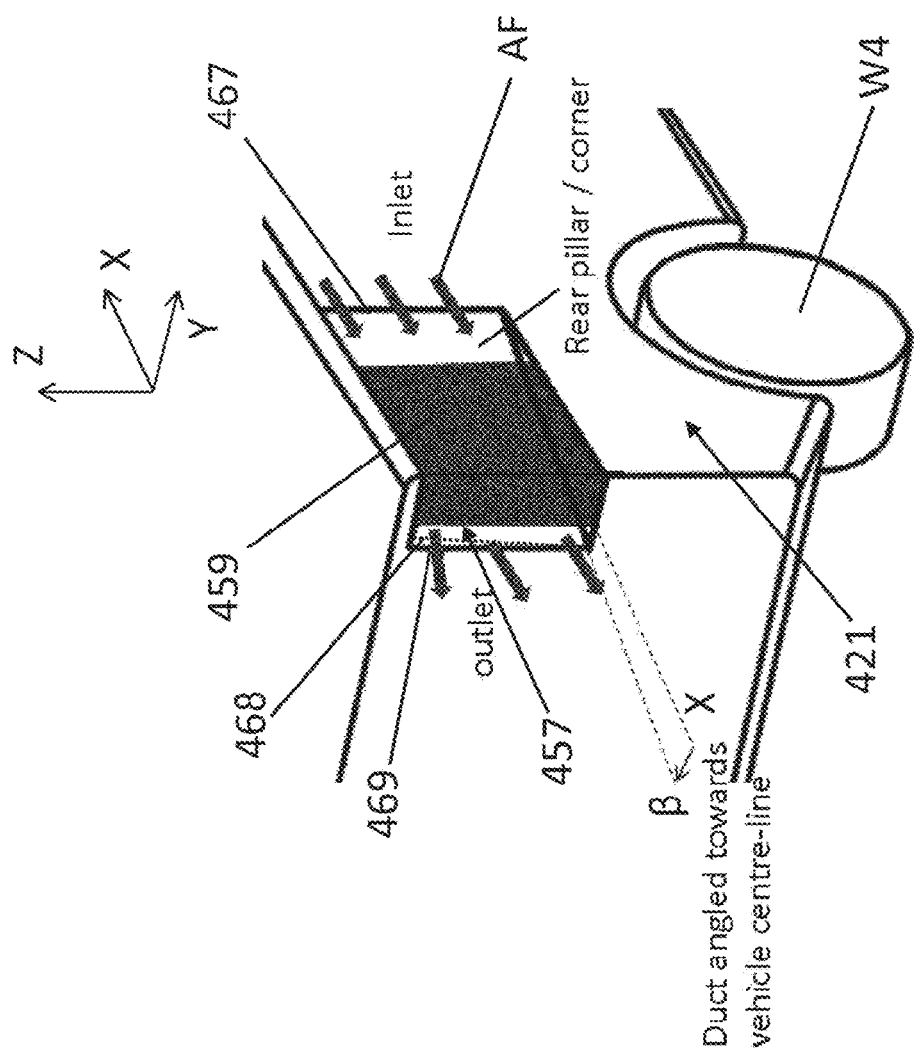
FIG. 11 shows an enlarged perspective view of a rear corner of the vehicle shown in FIGS. 10A-C.

As shown in FIG. 11, the right rear pillar duct 457 comprises a duct inlet 467 and a duct outlet 469. The duct inlet 467 lies flush with (or is inset from) a respective side of the vehicle 401 so as not to protrude into the airflow along the side of the vehicle. Thus, airflow attached to a side of the vehicle 401 (the glazing or 'glasshouse' in the present embodiment) is drawn into the rear pillar duct 457 disposed on that side of the vehicle 401. The right rear pillar duct 457 is arranged such that the airflow exiting the duct outlet 469 comprises a lateral component directed inwardly towards a longitudinal centre line ₵ of the vehicle 401, as illustrated in FIG. 10C. The left rear pillar duct 457 has a corresponding arrangement, albeit a mirror image of the right rear pillar duct 457.

The rear pillar ducts 457 are each arranged to entrain airflow travelling along a side of the vehicle 401 and direct it inwardly towards a longitudinal centre line of the vehicle, thereby reducing the width of the wake formed behind the vehicle 401. A perspective view of the rear corner of the vehicle 401 is shown in FIG. 11 to illustrate the angular orientation of the airflow exiting the duct outlet 469 and the resulting airflow at the rear of the vehicle 401. The rear pillar duct 457 and/or the rear pillar vane 459 on each side of the vehicle 401 are configured such that, in use, the airflow exiting the respective duct outlets 469 is inclined inwardly at a first angle $\beta$ relative to a longitudinal axis X of the vehicle 401. The first angle $\beta$ can be substantially uniform over the vertical extent of each rear pillar duct 457. Alternatively, the first angle $\beta$ can vary with vertical position on each rear pillar duct 457. For example the first angle $\beta$ can increase towards the top of each rear pillar duct 457 to increase the change in flow direction closer to the roof 461 of the vehicle 401, as indicated by the upper arrow in FIG. 11. A continuous change in the configuration of the rear pillar duct 457 and/or the rear pillar vane 459 can result in a progressive change in the first angle β, for example to increase the angle β towards the top of each rear pillar duct 457 to increase the turn-in effect on the airflow closer to the roof 461.

The duct outlet 469 can have a substantially uniform width along its length. In an alternate arrangement, the width of the duct outlet 469 can vary. For example, as indicated by the dotted line 468 in FIG. 11, the width of the duct outlet 469 can decrease towards the top of the respective left and right rear pillar ducts 457. In use, this configuration can develop a faster (more energetic) jet of air proximal the roof 461 to promote interference with the rear corner vortices. The change in width of the duct outlet 469 can be continuous or could be stepped.

The left and right rear pillar ducts 457 are provided to control the formation of the wake behind the vehicle 401. The left and right rear pillar ducts 457 each generate a vertically-elongated jet of air which is directed inwardly towards a centre line of the vehicle 401 to control the formation of the wake behind the vehicle 401. The influence of the jet of air on the airflow downstream of the vehicle 401 (i.e. behind the vehicle 401 when it is travelling in a forwards direction) will now be described in more detail with reference to the fluid flow simulations shown in FIGS. 12 to 14. First, second and third virtual vehicle model (M1, M2, M3) are shown in FIGS. 12A, 13A and 14A respectively further to illustrate the function of the left and right rear pillar ducts 457 to control the formation of the wake behind the vehicle. The wake in relation to each of the vehicle models M1, M2, M3 is visualised in a horizontal rectangle R1, R2, R3 by the flow patterns illustrated in FIGS. 12B, 13B and 14B. Within the wake, the vortices generated off each side of the vehicle model M1, M2, M3 close together as they travel downstream and a wake closure point (d) defines the rearmost extent of the near-wake.

The first vehicle model M1, shown in FIG. 12A, has a bluff rear section (equivalent to a tailgate 415 arranged perpendicular to the sides of the vehicle 401). As shown in FIG. 12B, the wake formed behind the first vehicle model M1 has a first width ($e_1$). A first wake closure point (not shown) for the first vehicle model M1 is located downstream of the modelled flow region shown in FIG. 12B.

The second vehicle model M2, shown in FIG. 13A, has a tapered rear section (equivalent to a boat tail planform) to allow the airflow to be drawn inwardly in a progressive manner as it flows around the rear of the second vehicle model M2. As shown in FIG. 13B, the wake formed behind the second vehicle model M2 has a second width ($e_2$). A second wake closure point ($d_2$) is also shown in FIG. 13B.

The third vehicle model M3, shown in FIG. 14A, comprises left and right rear pillar ducts 457 in accordance with the present embodiment. As shown in FIG. 14B, the wake formed behind the third simulation model M3 has a third width ($e_3$). A wake closure point ($d_3$) is also shown in FIG. 14B.

The modelled wake closure point for the first vehicle model M1 is further downstream than the second and third wake closure points ($d_2$, $d_3$). Furthermore, the first width ($e_1$) of the wake behind the first vehicle model M1 is larger than both the second and third widths ($e_2$, $e_3$). As shown in FIGS. 13B and 13C, the wake from the second and third vehicle models M2, M3 are similar in size and profile. It will be appreciated, therefore, that the left and right rear pillar ducts 457 change the effective shape of the rear of the vehicle to provide a boat-tail effect. At least in certain embodiments, the left and right rear pillar ducts 457 can help to reduce aerodynamic drag as the vehicle 401 travels in a forwards direction.

By introducing a jet of air into the wake behind the vehicle 401, the outer shear layers can be drawn inwardly providing a flow structure approaching that resulting from physical 'boat tailing'. In particular, the wake closure point ($d_3$) moves closer to the vehicle rear and the wake width ($e_3$) reduces. At least in certain embodiments, this can lead to a pressure recovery on the rear surfaces (base) of the vehicle and a consequent reduction in aerodynamic drag. The left and right rear pillar ducts 457 can each generate a jet of air operatively to control lateral propagation of the turbulent airflow downstream of the vehicle (the vehicle wake). It will be appreciated that the left and right rear pillar ducts 457 are a passive (un-powered) ducting system that takes airflow attached to the vehicle roof, glasshouse, bodyside or bumper and ducts it into the rear wake.

Figure 15:
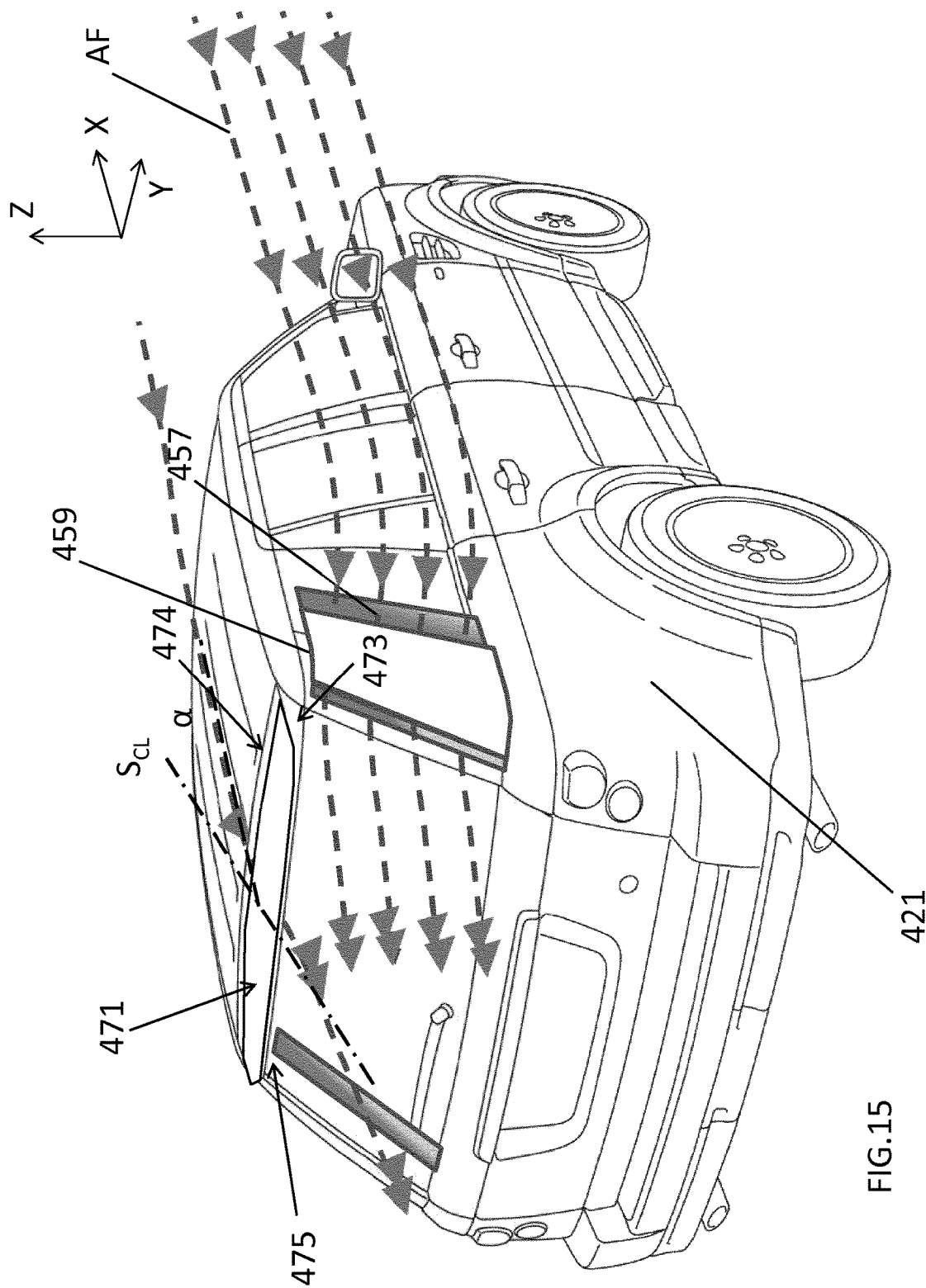
FIG. 15 shows a rear perspective view of the vehicle shown in FIGS. 10A-C incorporating a transverse aerodynamic member.

A modified arrangement of the vehicle 401 according to the previous embodiment is shown in FIG. 15. The modified vehicle 401 comprises a roof spoiler 471 mounted to the roof 461. Like reference numerals are used for like components in this modified arrangement.

The roof spoiler 471 is arranged to direct airflow downwardly at the rear of the roof 461. A chord line $S_{CL}$ is defined in a vertical plane through the roof spoiler 471. The chord line $S_{CL}$ extends from a leading edge of the roof spoiler 471 to a trailing edge thereof. The roof spoiler 471 is arranged such that the chord line $S_{CL}$ is disposed at an angle of incidence α relative to the longitudinal axis X of the vehicle 401. The angle of incidence α is positive along at least a portion of the width of the roof spoiler 471 such that the leading edge is disposed vertically above the trailing edge. The roof spoiler 471 is arranged to define a roof duct 473 having a roof duct inlet 474 and a roof duct outlet 475. The roof duct 473 extends transversely and has a converging section towards the rear of the vehicle 401 to form a jet of air extended in a lateral direction. When the vehicle 401 is travelling in a forwards direction, the jet of air established by the roof spoiler 471 has a downwardly directed component. At least in certain embodiments, the jet of air can help to control the vertical extent of the wake formed downstream of the vehicle 401.

The roof spoiler 471 can be arranged such that the angle of incidence α is uniform across its width. Alternatively, the roof spoiler 471 can be arranged such that the angle of incidence α α varies in a transverse direction. For example, the angle of incidence α can increase towards the lateral sides of the roof spoiler 471.

Alternatively, or in addition, the height of the roof duct 473 can vary in a transverse direction. The height of the roof duct 473 can decrease in a laterally outwards direction such that, in use, a faster (more energetic) jet of air is established outboard. At least in certain embodiments, the resulting airflow at the outboard regions of the roof duct 473 would interfere with vortices that form at the upper outboard corners of the rear of the vehicle 401.

The roof spoiler 471 could be used without the left and right rear pillar ducts 457. However, the combination of the roof spoiler 471 and the left and right rear pillar ducts 457 can provide effective control of the wake downstream of the vehicle 401.

The roof spoiler 471 in the present embodiment has a fixed configuration. However, this could be modified to implement a movable roof spoiler 471. For example, the roof spoiler 471 could be movable between a retracted position and a deployed position. The roof spoiler 471 could travel along a rectilinear path, for example along one or more linear rails. Alternatively, the roof spoiler 471 could travel along an arcuate path as it is deployed. The angle of incidence α of the roof spoiler 471 could change as the roof spoiler 471 is deployed. A drive mechanism could be provided on one or both sides of the roof spoiler 471. Alternatively, or in addition, a drive mechanism can be disposed in a centre spine formed in roof 461 of the vehicle 401. The drive mechanism can comprise an actuator, for example an electric machine, arranged to drivingly rotate a lead screw. The roof spoiler 471 could have a slatted configuration, for example comprising a plurality of transverse spoiler elements which deploy to control the incident flow in a progressive manner.

A vehicle 501 incorporating a deployable diffuser assembly 575 according to a further embodiment is shown in FIGS. 16 to 18. The vehicle 501 is a development of the vehicle 201 described herein with reference to FIG. 6. Accordingly, like reference numerals will be used for like components, albeit incremented by 300 to aid clarity.

Figure 16A:
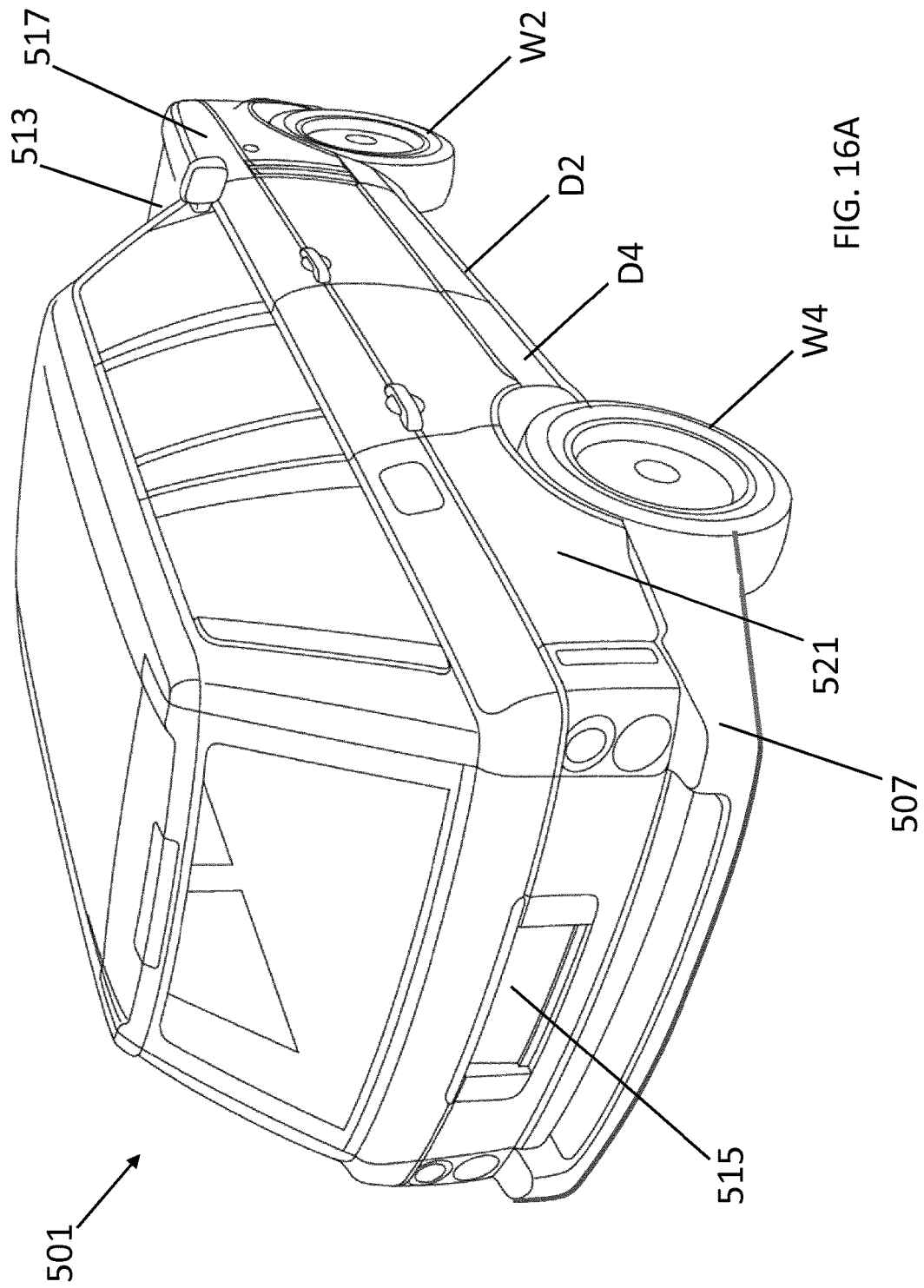
FIGS. 16A and 16B show rear perspective views of a vehicle incorporating a deployable diffuser in accordance with a further embodiment of the present invention.
Figure 17A:
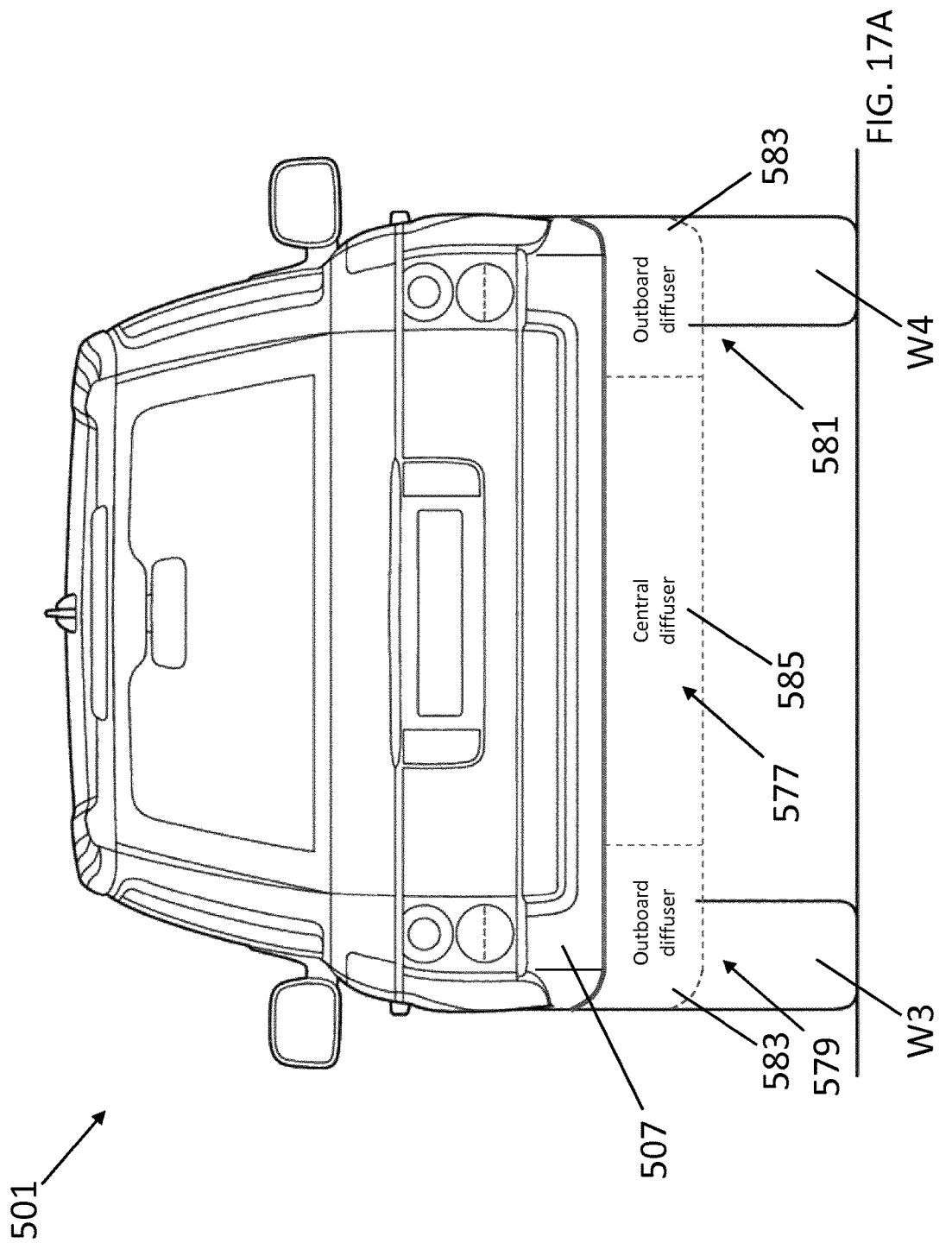
FIGS. 17A and 17B show rear elevations of the vehicle shown in FIGS. 16A and 16B.
Figure 17B:
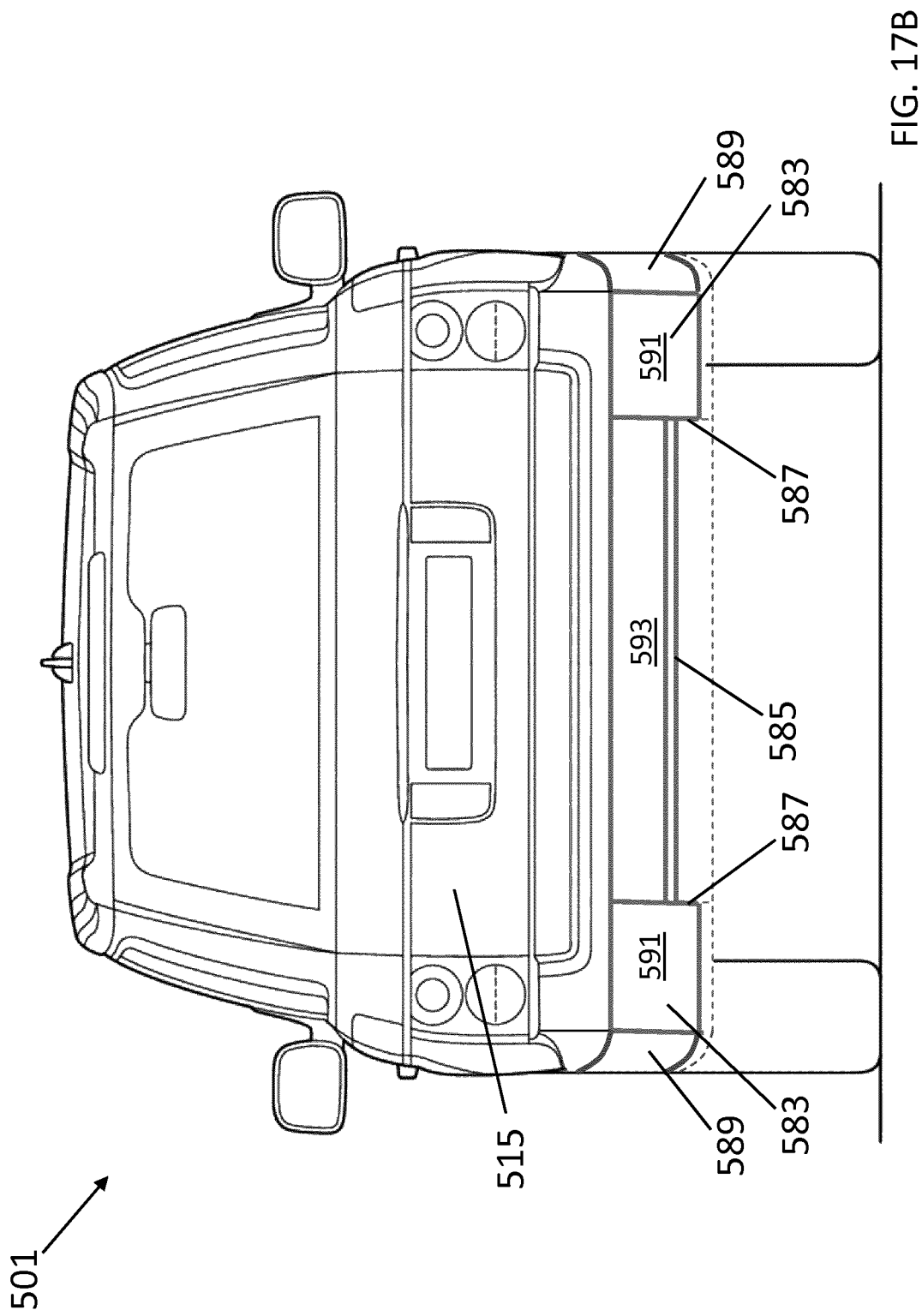

As shown in FIG. 16A, the vehicle 501 comprises a rear bumper 507, a bonnet 513, a tailgate 515, left and right wings (fenders) 517, left and right quarter panels 521, left and right front wheels W1, W2, left and right rear wheels W3, W4, and four doors D1-4. The front wheels W1, W2 are disposed in front wheel houses formed in the left and right wings 517; and the rear wheels W3, W4 are disposed in rear wheel houses formed in the left and right quarter panels 521.

Figure 16B:
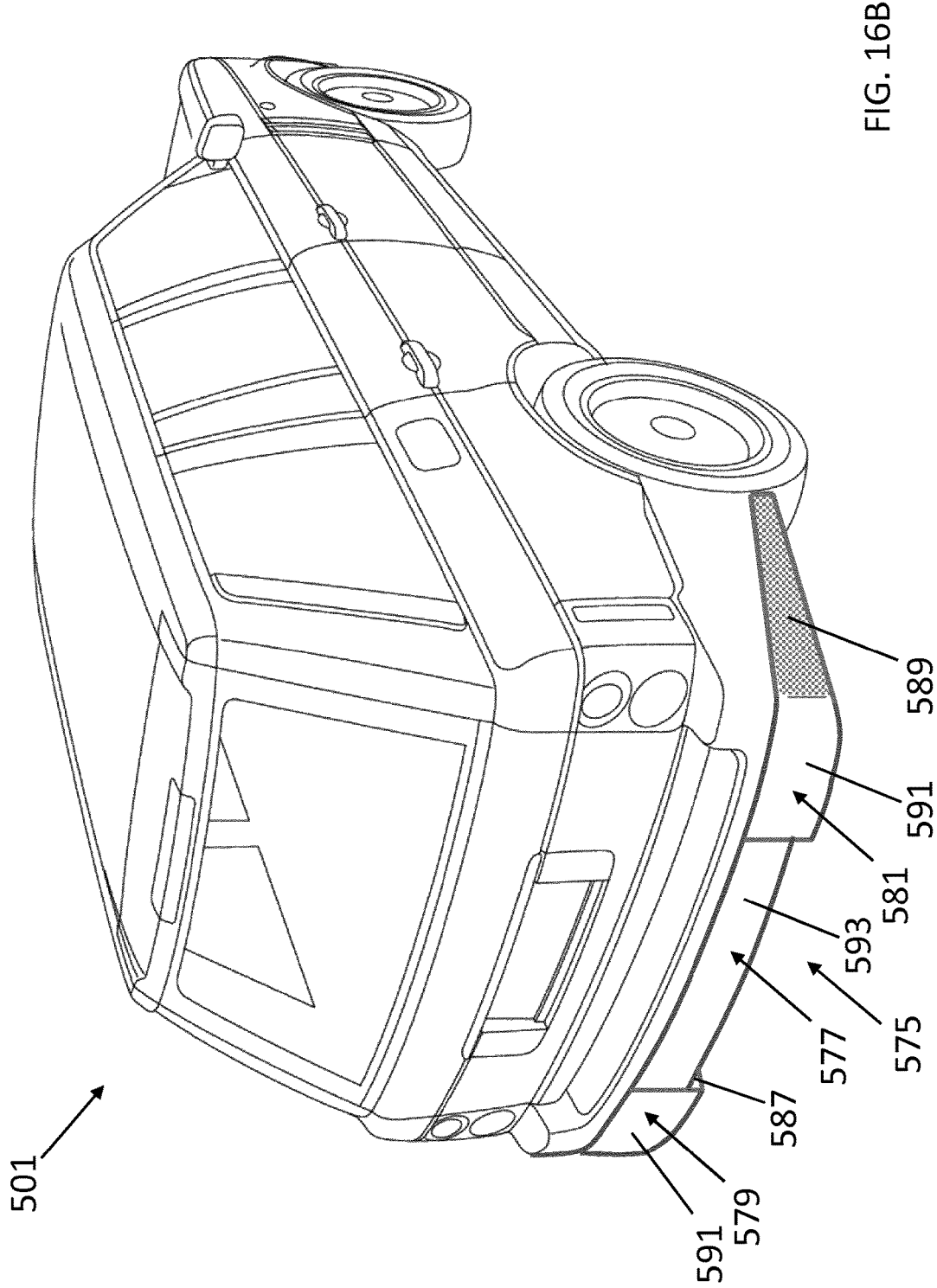

As shown in FIG. 16B, the diffuser assembly 575 comprises a central diffuser 577, a left lateral outboard diffuser 579 and a right lateral outboard diffuser 581. The diffusers 577, 579, 581 are each movable from a retracted position (as shown in FIG. 16A) to one or more deployed positions (as shown in FIG. 16B). In their retracted positions, the diffusers 577, 579, 581 are displaced upwardly into a recess formed under the vehicle body within the rear bumper 507. When they are deployed, the diffusers 577, 579, 581 are displaced downwardly into the region behind the rear wheels W3, W4 below the rear bumper 507. In the present embodiment, the diffusers 577, 579, 581 each undergo a combination of translation and rotation as they travel between said retracted and deployed positions.

The diffuser assembly 575 comprises separate actuator mechanisms (not shown) for drivingly displacing each diffuser 577, 579, 581 to said one or more deployed positions. An electronic control unit (not shown) is provided to control operation of the actuator mechanisms selectively to deploy the diffusers 577, 579, 581. The actuator mechanisms can, for example, each comprise an electric machine for drivingly rotating a lead screw coupled to a linkage assembly. The linkage assembly can, for example, comprise a four-bar link assembly configured to provide the combined translational and rotational movement.

The lateral outboard diffusers 579, 581 each comprise a lateral diffusing panel 583 (shown in FIGS. 17A and 17B) for controlling the high speed airflow exiting from underneath the rear of the vehicle 501 and the wake from the rear wheels D3, D4. The central diffuser 577 comprises a central diffusing panel 585 (shown in FIGS. 17A and 17B). The left and right lateral outboard diffusers 579, 581 each comprise an inner side panel 587, an outer side panel 589 and a lateral rear facing panel 591. The inner side panels 587 are arranged adjacent to the lateral sides of the central diffuser 577 to control airflow at the sides of the central diffusing panel 585. In particular, the inner side panels 587 function as endplates to limit airflow around the lateral edges of the central diffuser 577. The outer side panels 589 are optional but can help to fill a void created behind the rear wheels W3, W4 when the lateral outboard diffusers 579, 581 are deployed. The outer side panels 589 could be fixedly mounted to the lateral diffusing panels 583 or could be deployed separately. The outer side panels 589 could optionally define a separation edge to control separation of the airflow along the sides of the vehicle. The separation edge can be in the form of a discrete edge configured to cause the airflow to separate in a controlled manner.

The central diffuser 577 comprises a central rear facing panel 593. When the vehicle is travelling in a forwards direction, the central rear facing panel 593 can operate to control airflow exiting at the trailing edge of the central diffusing panel 585. The outer side panels 589, the lateral rear facing panels 591, and the central rear facing panel 593 hide the underside of the vehicle body from view when the diffusers 577, 579, 581 are deployed and can help to reduce aerodynamic drag.

Figure 18A:
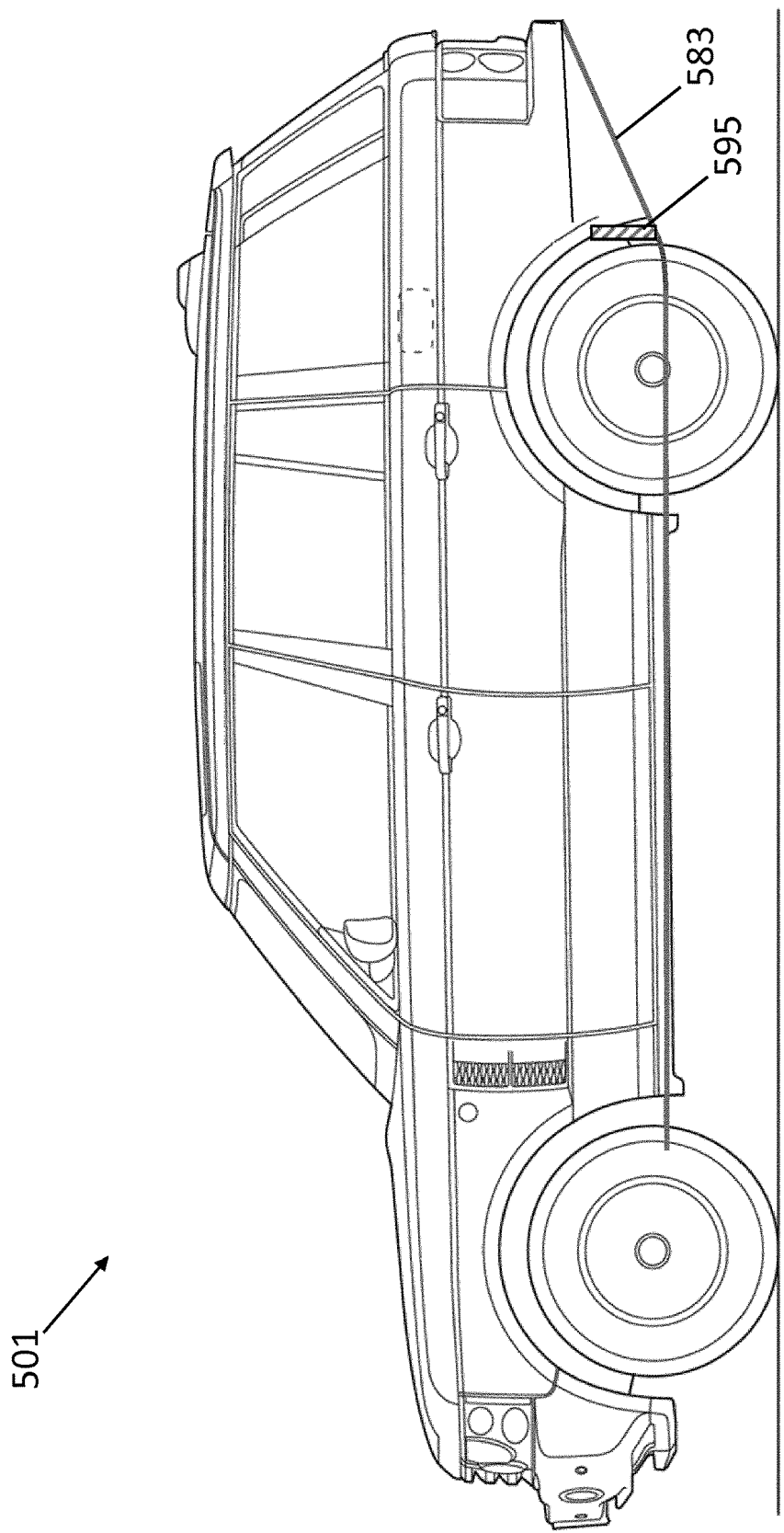
FIGS. 18A and 18B show side elevations of the vehicle shown in FIGS. 16A and 16B.
Figure 18B:
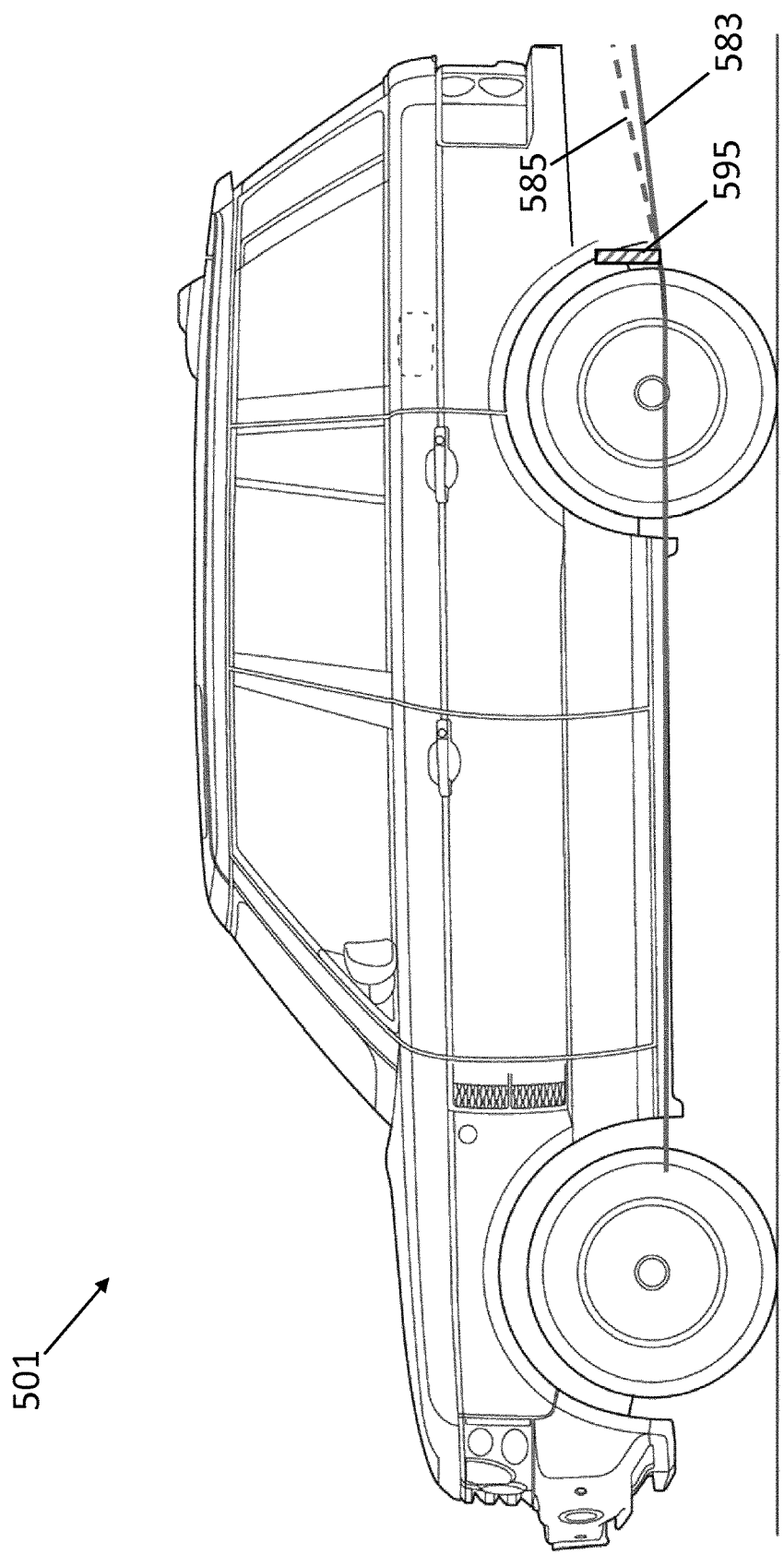

A side elevation of the vehicle 501 with the diffusers 577, 579, 581 in a retracted position is shown in FIG. 18A. The profile of the diffusers 577, 579, 581 in a deployed state is shown in FIG. 18B (with the central diffuser 577 shown as a dashed line). The left and right lateral outboard diffusers 579, 581 can be deployed together or independently of each other. The extent to which the left lateral outboard diffuser 579 and/or the right lateral outboard diffuser 581 are deployed could be actively controlled, either together or independently of each other. Furthermore, the central diffuser 577 can be deployed independently or in conjunction with said left lateral outboard diffuser 579 and/or the right lateral outboard diffuser 581. As shown in FIG. 18B, the left and right lateral outboard diffusers 579, 581 can be deployed to a deployed position projecting downwardly below the central diffuser 577. In this configuration, the inner side panels 587 of the left and right lateral outboard diffusers 579, 581 function as end-plates for the bottom panel of the central diffuser 577. The leakage of air around the lateral edges of the central bottom panel can be reduced or inhibited, thereby improving aerodynamic efficiency.

The lateral outboard diffusers 579, 581 can optionally also comprise a closure panel 595 for extending the effective depth of the rear of the wheel arch. The closure panel 595 extends transversely behind the rear wheels W3, W4 and can be deployed with the lateral outboard diffusers 579, 581. The closure panel 595 could be formed integrally with the lateral outboard diffusers 579, 581 or could be a separate component. The closure panel 595 can help control the airflow from the rear wheels W3, W4 onto the lateral diffusing panels 583.

The electronic control unit can control the deployment of one or more of the diffusers 577, 579, 581 based on vehicle dynamic parameters. For example, one or more of the diffusers 577, 579, 581 can be deployed when the vehicle speed exceeds a predefined threshold. The lateral outboard diffusers 579, 581 can be deployed together in conjunction with or independently of the central diffuser 577. The diffuser 577, 579, 581 could also be deployed when the vehicle is stationary for aesthetic purposes. The electronic control unit can be configured selectively to retract the one or more of the diffusers 577, 579, 581 to provide improved ground clearance for the vehicle 501. For example, the electronic control unit could be configured to retract the one or more of the diffusers 577, 579, 581 when an off-road driving mode is activated. The off-road driving mode could be activated by the driver or could be activated automatically.

At least in certain embodiments, the deployable diffuser assembly 575 is operative to reduce aerodynamic drag and/or to control lift. When deployed, the diffusers 577, 579, 581 help to control the transition between the airflow underneath the vehicle 501 (having a relatively high velocity) and the airflow behind the vehicle (having a relatively low velocity). The diffusers 577, 579, 581 thereby promote a progressive change in the speed of the airflow exiting from underneath the vehicle 501 and potentially also generate downforce. By controlling the airflow exiting from underneath the vehicle 501, the diffusers 577, 579, 581 can help to control the wake formed behind the vehicle 501.

The deployable diffuser assembly 575 can be combined with one or more of the other embodiments described herein. For example, the deployable diffuser assembly 575 can be combined with the deployable roof spoiler 471 incorporated into the embodiment illustrated in FIG. 15 (with or without the rear pillar ducts 457). The diffuser assembly 575 and the roof spoiler 471 can be used in conjunction with each other to control the formation and/or propagation of the vehicle wake. For example, the roof spoiler 471 and one or more of the diffusers 577, 579, 581 can be deployed to control the depth of the wake formed behind the vehicle. The combination of the central diffuser 577 and the roof spoiler 471 may prove particularly effective in this respect. Thus, the central diffuser 577 and the rear spoiler 471 may be deployed in unison. The lateral outboard diffusers 579, 581 may help to control the lateral propagation of the vehicle wake.

It will be appreciated that various changes and modifications can be made to the embodiments described herein without departing from the spirit of the present application.

The embodiments described herein have particular application to road-going vehicles (also referred to as street legal or road legal vehicles) that are equipped and licensed for use on public roads. The vehicles may also have off-road capabilities. The embodiments described herein refer to a motor vehicle comprising four doors (excluding the tailgate or boot lid), but the vehicle could have a two door configuration (excluding the tailgate or boot). Furthermore, the embodiments described herein by way of example include a motor vehicle having a saloon (sedan) configuration and a sports utility vehicle. It will be appreciated that aspects of the present invention(s) could be applied to other vehicle configurations. For example, the vehicle could be an estate car (station wagon), hatch-back, coupe, off-road vehicle or a sports utility vehicle. Furthermore, the invention(s) described herein are not limited to motor vehicles. The vehicle can be an automobile, a truck, a lorry, an articulated vehicle and so on.

The present disclosure describes positioning adjacent panels to form a substantially continuous exterior surface. It will be appreciated that this is subject to usual manufacturing clearances and tolerances for exterior panels. A shut line (or cut line) is formed between adjacent panels where one (or both) of the panels is movable. The shut line comprises a clearance gap to accommodate relative movement of the panels. The outer surfaces of the panels on each side of the shut line are aligned with each other to form the substantially continuous exterior surface described herein. Thus, the composite exterior surface (defined by two or more panels) is substantially continuous insofar as it is free from steps or offsets at the interface between the panels. By way of example, the substantially continuous exterior surface can comprise a continuous curved surface (formed in 2-dimensions or 3-dimensions) and/or a continuous planar surface.

The invention claimed is:

1. A vehicle comprising:
a first duct having a first duct inlet and a first duct outlet; and
a second duct having a second duct inlet and a second duct outlet;
wherein the first and second duct inlets are arranged substantially in line with or inset from respective first and second lateral sides of the vehicle; and
the first and second duct outlets are disposed at or proximal to a rear of the vehicle;
the first and second ducts being arranged, in use, to direct respective first and second jets of air inwardly to control the lateral and/or longitudinal propagation of a wake formed behind the vehicle, wherein the vehicle comprises a body structure having a roof mounted to pillars comprising first and second rear pillars, an outer surface of said first rear pillar defining a first sidewall of said first duct and an outer surface of said second rear pillar defining a second sidewall of said second duct, wherein the first and second ducts are each comprised of a structural component of the body structure that is spaced from the first and second rear pillars.

2. A vehicle as claimed in claim 1, the first and second duct inlets each comprising an upstream edge and a downstream edge; wherein the structural component of the first and second ducts comprise a first guide vane and a second guide vane, respectively, that define the downstream edge of the respective first and second duct inlets.

3. A vehicle as claimed in claim 2, wherein the downstream edges of the respective first and second duct inlets are disposed in line with or inset from the upstream edges of the respective first and second duct inlets.

4. A vehicle as claimed in claim 2, wherein the first and second guide vanes are adapted to direct the jet of air exiting the respective first and second duct outlets inwardly towards a longitudinal centre line of the vehicle.

5. A vehicle as claimed in claim 2 comprising a body structure having a roof mounted to first and second front pillars and to the first and second rear pillars.

6. A vehicle as claimed in claim 5, wherein the first and second guide vanes are spaced laterally outwardly from the respective first and second rear pillars.

7. A vehicle as claimed in claim 5, wherein the first and second duct inlets are disposed in front of the respective first and second rear pillars.

8. A vehicle as claimed in claim 5, wherein the body structure comprises first and second rear quarter panels, the first and second guide vanes extending between said respective first and second rear quarter panels and the roof.

9. A vehicle as claimed in claim 8, wherein a substantially continuous exterior surface is formed at the interface between said first and second guide vanes and the respective first and second rear quarter panels.

10. A vehicle as claimed in claim 1, wherein the first and second duct outlets are extended in a vertical direction such that, in use, the first and second jets of air are elongated vertically.

11. A vehicle as claimed in claim 1, wherein the first and second duct inlets have a larger cross section than the first and second duct outlets.

12. A vehicle as claimed in claim 1, wherein a width of the first and second duct outlets is substantially uniform in a vertical direction.

13. A vehicle as claimed in claim 1, wherein a width of the first and second duct outlets decreases towards a top of the respective first and second ducts.

14. A vehicle as claimed in claim 1, wherein said first and second duct outlets are disposed on each side of a tailgate.

15. A vehicle as claimed in claim 1 comprising a transverse aerodynamic member arranged to direct airflow downwardly at the rear of the vehicle to control the vertical propagation of the wake formed behind the vehicle.

16. A vehicle as claimed in claim 15, wherein the transverse aerodynamic member is deployable in a rearwards direction.

17. A vehicle as claimed in claim 1, wherein said first and second rear pillars extend from the vehicle waistline towards the roof of the vehicle.

18. A vehicle as claimed in claim 1, comprising a glasshouse, wherein the glasshouse comprises said first and second rear pillars.

19. A vehicle as claimed in claim 3, wherein a most outboard edge of the first duct outlet is inboard relative to a most inboard edge of the first duct inlet, and wherein a most outboard edge of the second duct outlet is inboard relative to a most inboard edge of the second duct inlet.

20. A vehicle as claimed in claim 4, wherein the first and second ducts are arranged such that the angle of the inward airflow relative to the longitudinal center line varies with respect to vertical position along the respective first and second ducts.

* * * * *